United States Patent
Tanaka et al.

(10) Patent No.: US 9,383,578 B2
(45) Date of Patent: Jul. 5, 2016

(54) OPTICAL SCANNER APPARATUS AND OPTICAL SCANNER CONTROL APPARATUS

(71) Applicants: Toyoki Tanaka, Tokyo (JP); Somei Takahashi, Tokyo (JP); Hisamichi Sekine, Tokyo (JP); Hisanori Aga, Tokyo (JP); Riichiro Hibiya, Tokyo (JP)

(72) Inventors: Toyoki Tanaka, Tokyo (JP); Somei Takahashi, Tokyo (JP); Hisamichi Sekine, Tokyo (JP); Hisanori Aga, Tokyo (JP); Riichiro Hibiya, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 0 days.

(21) Appl. No.: 14/591,260

(22) Filed: Jan. 7, 2015

(65) Prior Publication Data
US 2015/0124304 A1 May 7, 2015

Related U.S. Application Data

(63) Continuation of application No. 13/626,059, filed on Sep. 25, 2012, now abandoned.

(30) Foreign Application Priority Data

Oct. 3, 2011 (JP) .................................. 2011-219255
Jul. 6, 2012 (JP) .................................. 2012-152834

(51) Int. Cl.
*G02B 26/10* (2006.01)
*G01B 11/25* (2006.01)
*G01S 7/481* (2006.01)
*G02B 26/08* (2006.01)
*G01C 9/06* (2006.01)

(52) U.S. Cl.
CPC .............. *G02B 26/105* (2013.01); *G01B 11/25* (2013.01); *G01C 9/06* (2013.01); *G01S 7/4817* (2013.01); *G02B 26/0858* (2013.01); *G02B 26/101* (2013.01); *G01C 2009/066* (2013.01)

(58) Field of Classification Search
CPC ............. G02B 26/0841; G02B 26/105; G02B 26/0833
See application file for complete search history.

(56) References Cited

U.S. PATENT DOCUMENTS 7,295,726 B1* 11/2007 Milanovic et al. .............. 385/18
2014/0198259 A1 7/2014 Murayama et al.

FOREIGN PATENT DOCUMENTS

JP 2009-169195 7/2009

* cited by examiner

*Primary Examiner* — Jennifer L. Doak
(74) *Attorney, Agent, or Firm* — IPUSA, PLLC

(57) ABSTRACT

An optical scanner apparatus includes first and second torsion beams which support a mirror support portion supporting a mirror from both sides in an axial direction; first and second horizontal driving beams configured to include first and second horizontal driving sources, respectively, a connecting beam; a first piezo-electric sensor; first and second sensor interconnects connected to one of and the other of an upper electrode and a lower electrode of the first piezo-electric sensor, respectively, the first sensor interconnect and the second sensor interconnect being formed to extend toward the first horizontal driving beam and the second horizontal driving beam, respectively.

8 Claims, 28 Drawing Sheets

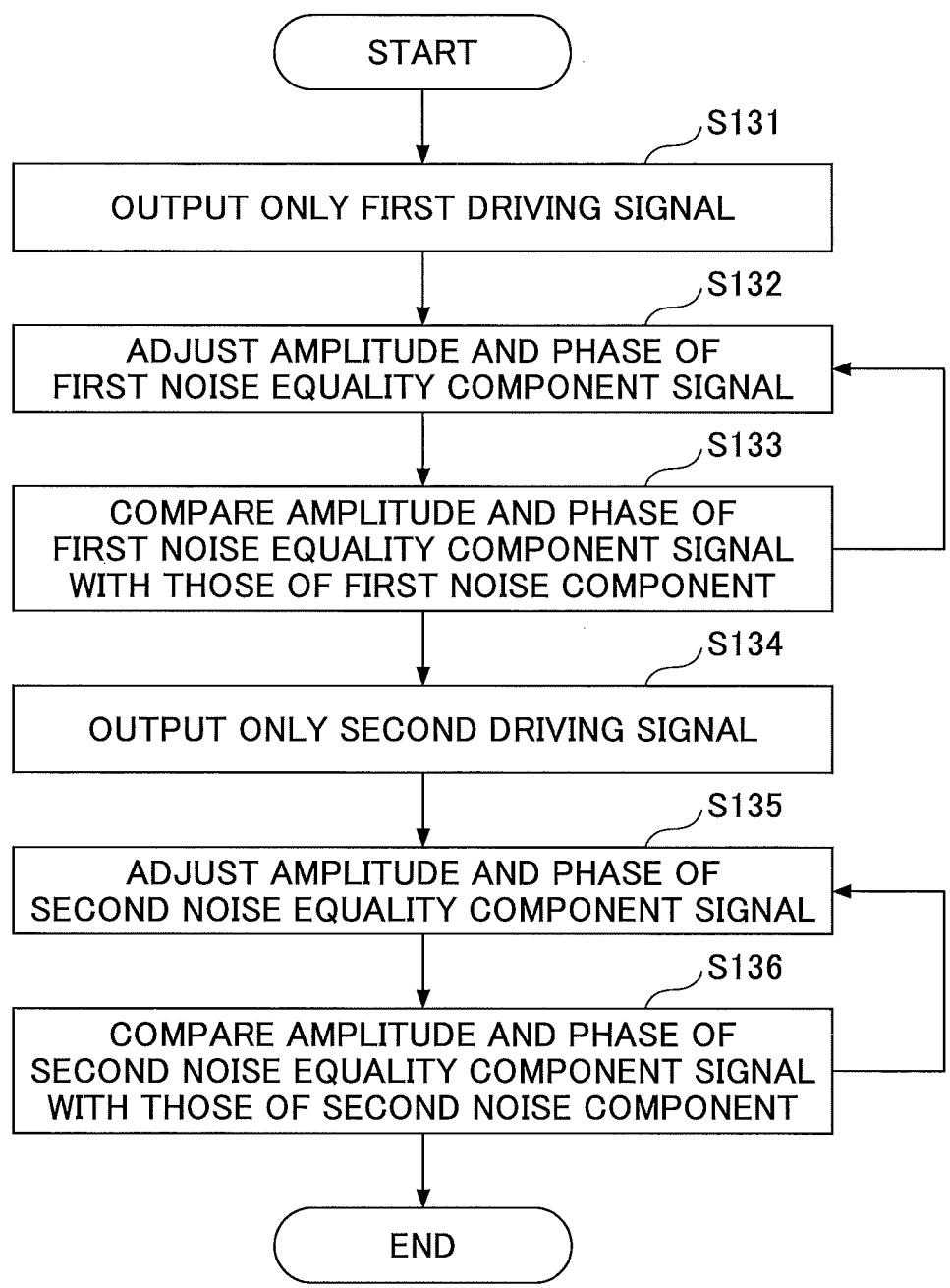

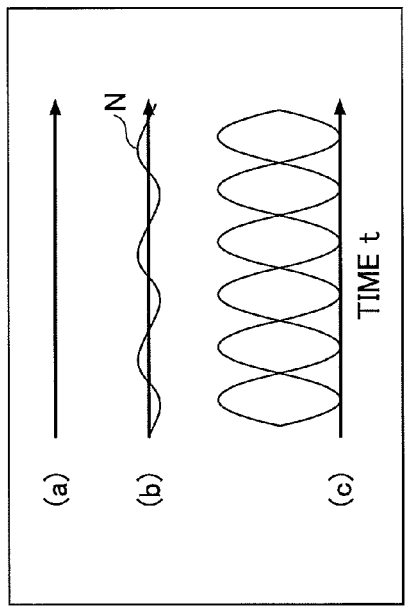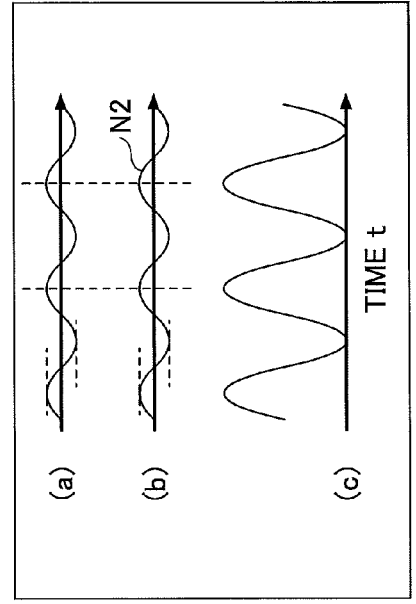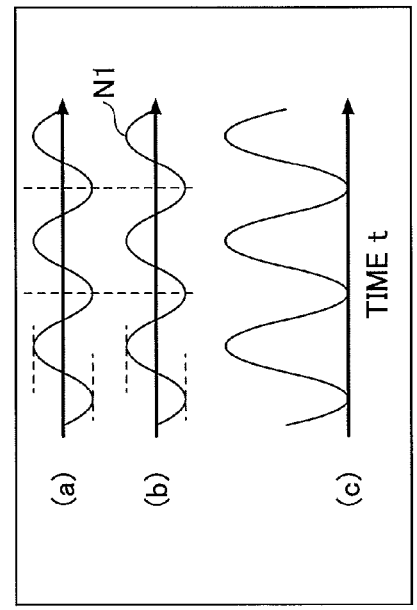

OPTICAL SCANNER APPARATUS AND OPTICAL SCANNER CONTROL APPARATUS

CROSS-REFERENCE TO RELATED APPLICATION

This application is a continuation application of U.S. patent application Ser. No. 13/626,059 filed on Sep. 25, 2012, which claims the benefit of priority of Japanese Priority Application No. 2011-219255 filed on Oct. 3, 2011, and Japanese Priority Application No. 2012-152834 filed on Jul. 6, 2012, the entire contents of which are hereby incorporated by reference.

BACKGROUND OF THE INVENTION

1. Field of the Invention

The present invention relates to an optical scanner apparatus and an optical scanner control apparatus.

2. Description of the Related Art

Conventionally, an optical scanner apparatus in which a mirror portion which reflects an input light is rotated around a rotational axis by an actuator including a lower electrode, a piezo-electric element and an upper electrode formed in this order to scan the reflected light is known. By this actuator, the mirror portion is oscillated in vertical and horizontal directions with respect to a reflection surface by applying driving voltages to the upper electrode and the lower electrode.

Further, in this optical scanner apparatus, a piezo-electric sensor for detection which detects a voltage generated in the piezo-electric element of the actuator while the mirror portion is being oscillated is further provided. An inclination of the mirror portion is detected by an output of the piezo-electric sensor for detection so that the operation of the actuator is controlled.

The voltage detected by the piezo-electric sensor for detection may be interfered by a noise as the voltage detected by the piezo-electric sensor for detection when the mirror portion is being oscillated is very small. Thus, various techniques have been developed to appropriately detect the voltage by the piezo-electric sensor for detection.

For example, Patent Document 1 discloses a technique in which an electrode of the actuator and an electrode of the piezo-electric sensor for detection are formed to be apart from each other. With this structure, it is described in Patent Document 1 that the grounded voltages for the actuator and the piezo-electric sensor for detection can be separated and the interference of the noise caused by the grounded voltage of the actuator to the voltage detected by the piezo-electric sensor for detection can be avoided.

However, according to the conventional technique, the voltage detected by the piezo-electric sensor for detection is very small and is easily interfered by a noise (crosstalk) from other signal lines. Thus, there is a possibility that an inclination of a mirror cannot be precisely detected because of the noise (crosstalk).

PATENT DOCUMENT

[Patent Document 1] Japanese Laid-open Patent Publication No. 2009-169195

SUMMARY OF THE INVENTION

The present invention is made in light of the above problems, and provides an optical scanner apparatus and an optical scanner control apparatus capable of precisely detecting an inclination of a mirror by reducing a noise to sensor interconnects.

According to an embodiment, there is provided an optical scanner apparatus including a mirror; a mirror support portion which supports the mirror; a first torsion beam and a second torsion beam which support the mirror support portion from both sides in an axial direction around which the mirror support portion is oscillated by torsions of the first torsion beam and the second torsion beam; a first horizontal driving beam and a second horizontal driving beam provided to interpose the mirror and the mirror support portion therebetween and configured to include a first horizontal driving source and a second horizontal driving source, respectively, for oscillating the mirror and the mirror support portion around the axial direction; a connecting beam that connects one side of the first horizontal driving beam and the second horizontal driving beam to the first torsion beam; a first piezo-electric sensor including a lower electrode, a piezo-electric element and an upper electrode formed in this order on the connecting beam and configured to detect a displacement of the connecting beam by an oscillation of the first torsion beam and the second torsion beam around the axial direction when the mirror is being oscillated by driving voltages applied to the first horizontal driving source and the second horizontal driving source of the first horizontal driving beam and the second horizontal driving beam, respectively; a first sensor interconnect and a second sensor interconnect connected to one of the upper electrode and the lower electrode of the first piezo-electric sensor and the other of the upper electrode and the lower electrode of the first piezo-electric sensor, respectively, the first sensor interconnect and the second sensor interconnect being formed to extend toward the first horizontal driving beam and the second horizontal driving beam, respectively.

According to another embodiment, there is provided an optical scanner control apparatus including the above optical scanner apparatus and a noise reduction unit that generates a first noise equality component signal and a second noise equality component signal from a first driving voltage applied to the first horizontal driving source and a second driving voltage applied to the second horizontal driving source, respectively, and removes a noise component from an output of the piezo-electric sensor based on the first noise equality component signal and the second noise equality component signal.

According to another embodiment, there is provided an optical scanner apparatus including a mirror; a mirror support portion which supports the mirror; a first torsion beam and a second torsion beam which support the mirror support portion from both sides in an axial direction around which the mirror support portion is oscillated by torsions of the first torsion beam and the second torsion beam; a first horizontal driving beam and a second horizontal driving beam provided to interpose the mirror and the mirror support portion therebetween and configured to include a first horizontal driving source and a second horizontal driving source, respectively, for oscillating the mirror and the mirror support portion around the axial direction; a connecting beam that connects one side of the first horizontal driving beam and the second horizontal driving beam to the first torsion beam; a first piezo-electric sensor and a fourth piezo-electric sensor each including a lower electrode, a piezo-electric element and an upper electrode formed in this order on the connecting beam and configured to detect a displacement of the connecting beam by an oscillation of the first torsion beam and the second torsion beam around the axial direction when the mirror is being oscillated by driving voltages applied to the first horizontal driving source and the second horizontal driving source of the first horizontal driving beam and the second horizontal driving beam, respectively; a first sensor interconnect and a second sensor interconnect connected to one of the upper electrode and the lower electrode of the first piezo-electric sensor and the other of the upper electrode and the lower electrode of the first piezo-electric sensor, respectively; a seventh sensor interconnect and an eighth sensor interconnect connected to one of the upper electrode and the lower electrode of the fourth piezo-electric sensor and the other of the upper electrode and the lower electrode of the fourth piezo-electric sensor, respectively; a first drive interconnect for providing the driving voltage to the first horizontal driving source; and a second drive interconnect for providing the driving voltage to the second horizontal driving source, the first sensor interconnect, the second sensor interconnect, the seventh sensor interconnect and the eight sensor interconnect being formed to extend toward one of the first horizontal driving beam and the second sensor interconnect and the first drive interconnect and the second drive interconnect being formed to extend toward the other of the first horizontal driving beam and the second sensor interconnect.

BRIEF DESCRIPTION OF THE DRAWINGS

Other objects, features and advantages of the present invention will become more apparent from the following detailed description when read in conjunction with the accompanying drawings.

FIG. 13 is a flowchart showing an example of a process of performing an adjustment for removing a noise component of an embodiment;
FIG. 14 is a view showing a waveform output from a piezo-electric sensor before removing the noise;
FIG. 15A and FIG. 15B are views showing an example of noise equality components.

DETAILED DESCRIPTION OF THE PREFERRED EMBODIMENTS

Figure 1:
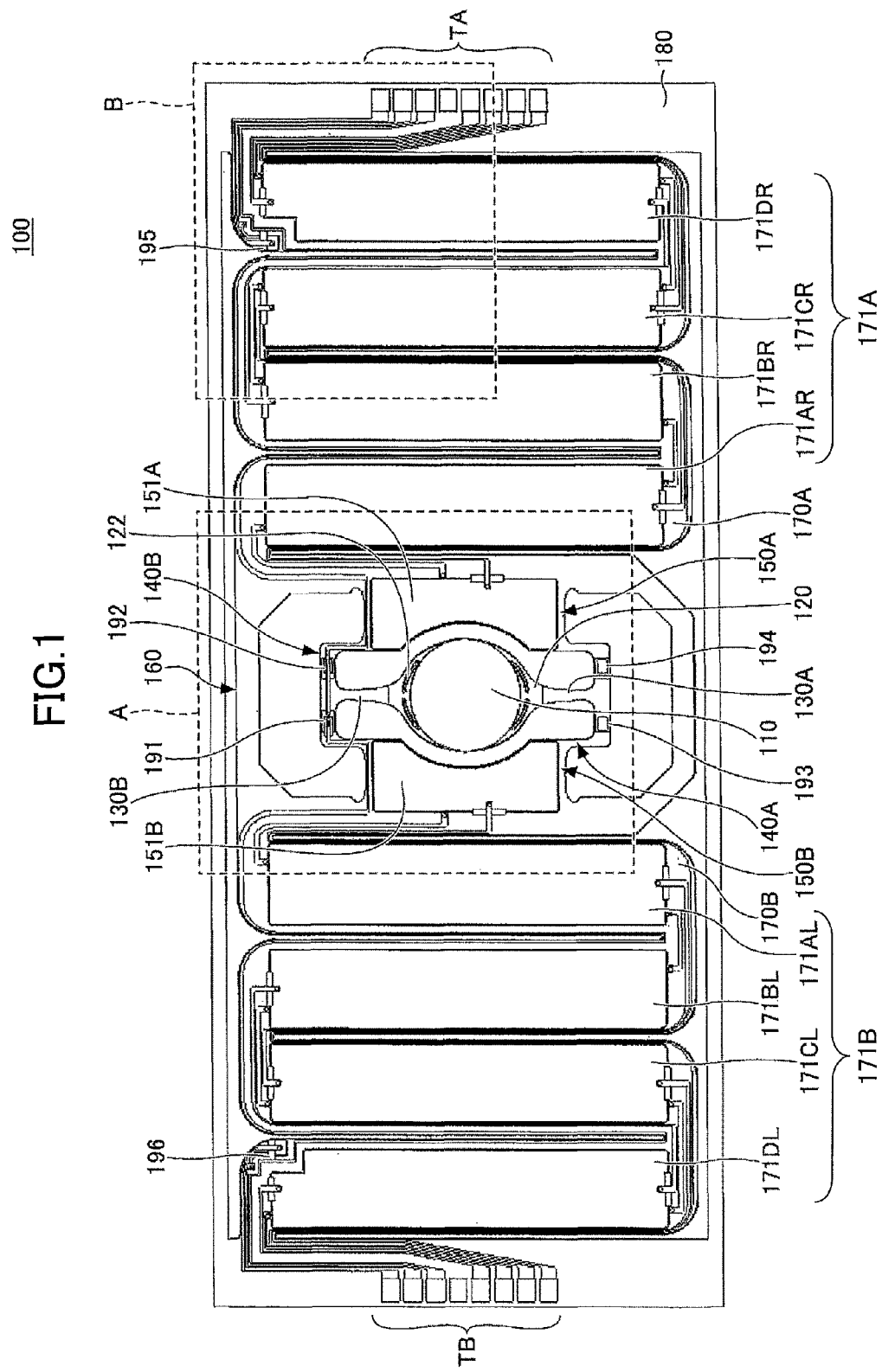
FIG. 1 is a view showing an example of an optical scanner apparatus of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

First Embodiment

The first embodiment is explained with reference to drawings. FIG. 1 is a view showing an example of an optical scanner apparatus 100 of the first embodiment.

The optical scanner apparatus 100 of the embodiment includes a mirror 110, a mirror support portion 120, a first torsion beam 130A, a second torsion beam 130B, a first connecting beam 140A, a second connecting beam 140B, a first horizontal driving beam 150A, a second horizontal driving beam 150B, a movable frame 160, a first vertical driving beam 170A, a second vertical driving beam 170B, and a fixed frame 180.

The first horizontal driving beam 150A and the second horizontal driving beam 150B of the embodiment include a first horizontal driving source 151A and a second horizontal driving source 151B, respectively. The first vertical driving beam 170A and the second vertical driving beam 170B include a first vertical driving source 171A and a second vertical driving source 171B, respectively.

The mirror support portion 120 of the embodiment is provided with slits 122 along a circumference of the mirror 110. By forming the slits 122, the mirror support portion 120 can be lightened so that torsion by the first torsion beam 130A and the second torsion beam 130B can be appropriately transmitted to the mirror 110.

In the optical scanner apparatus 100 of the embodiment, the mirror 110 is supported at a surface of the mirror support portion 120. The mirror support portion 120 is connected to ends of the first torsion beam 130A and the second torsion beam 130B which are provided at both ends of the mirror support portion 120.

The first torsion beam 130A and the second torsion beam 130B form an oscillating shaft of the mirror 110 and extend in an axial direction (vertical direction in FIG. 1) of the oscillating shaft while supporting the mirror support portion 120 at both ends of the mirror support portion 120 in the axial direction. When the first torsion beam 130A and the second torsion beam 130B are distorted, the mirror 110 supported by the mirror support portion 120 is oscillated so that reflected light irradiated on the mirror 110 is scanned.

The first torsion beam 130A and the second torsion beam 130B are connected to be supported by the first connecting beam 140A and the second connecting beam 140B, respectively. The first torsion beam 130A and the second torsion beam 130B are connected to the first horizontal driving beam 150A via the first connecting beam 140A and to the second horizontal driving beam 150B via the second connecting beam 140B, respectively.

The first horizontal driving beam 150A, the second horizontal driving beam 150B, the first connecting beam 140A, the second connecting beam 140B, the first torsion beam 130A, the second torsion beam 130B, the mirror support portion 120 and the mirror 110 are surrounded by the movable frame 160. One ends of the first horizontal driving beam 150A and the second horizontal driving beam 150B are supported by the movable frame 160. The other end of the first horizontal driving beam 150A is connected to the first connecting beam 140A and the second connecting beam 140B at an inner side. Similarly, the other end of the second horizontal driving beam 150B is connected to the first connecting beam 140A and the second connecting beam 140B at inner side.

The first horizontal driving beam 150A and the second horizontal driving beam 150B are placed to face with each other in a direction (horizontal direction in FIG. 1) perpendicular to the axial direction of the oscillating shaft formed by the first torsion beam 130A and the second torsion beam 130B while interposing the mirror 110 and the mirror support portion 120 therebetween.

The first horizontal driving source 151A and the second horizontal driving source 151B are formed on surfaces of the first horizontal driving beam 150A and the second horizontal driving beam 150B, respectively. Each of the first horizontal driving source 151A and the second horizontal driving source 151B include a lower electrode, a thin film of piezo-electric element and an upper electrode formed in this order on the first horizontal driving beam 150A and the second horizontal driving beam 150B, respectively.

The first horizontal driving source 151A and the second horizontal driving source 151B extend or shrink in accordance with polarities of driving voltages applied to the upper electrode and the lower electrode. Thus, by alternately applying driving voltages of different phases to the first horizontal driving beam 150A and the second horizontal driving beam 150B, the first horizontal driving beam 150A and the second horizontal driving beam 150B alternately oscillate upward or downward, opposite from each other, at right-side and left-side of the mirror 110. Therefore, the mirror 110 is oscillated or rotated around the oscillating shaft formed by the first torsion beam 130A and the second torsion beam 130B. The oscillating or rotating direction of the mirror 110 around the oscillating shaft formed by the first torsion beam 130A and the second torsion beam 130B is referred to as a "horizontal direction" hereinafter. For example, for driving the first horizontal driving beam 150A and the second horizontal driving beam 150B in the horizontal direction, a resonance frequency may be used to oscillate the mirror 110 at high speed.

One ends of the first vertical driving beam 170A and the second vertical driving beam 170B are connected to outer side of the movable frame 160, respectively. The first vertical driving beam 170A and the second vertical driving beam 170B are provided to face with each other in the direction perpendicular to the axial direction of the oscillating shaft formed by the first torsion beam 130A and the second torsion beam 130B while interposing the movable frame 160 therebetween.

The first vertical driving beam 170A includes plural beams which are extending in parallel with respect to the first horizontal driving beam 150A where adjacent beams are connected with each other at respective ends to form a zig-zag shape as a whole. The other end of the first vertical driving beam 170A is connected to an inner side of the fixed frame 180.

Similarly, the second vertical driving beam 170B includes plural beams which are extending in parallel with respect to the second horizontal driving beam 150B where adjacent beams are connected with each other at respective ends to form a zig-zag shape as a whole. The other end of the second vertical driving beam 170B is connected to an inner side of the fixed frame 180

The first vertical driving source 171A and the second vertical driving source 171B are formed on surfaces of each of the rectangular beams, not including curbed portions, of the first vertical driving beam 170A and the second vertical driving beam 170B, respectively. In this embodiment, the first vertical driving source 171A includes driving sources 171AR, 171BR, 171CR and 171DR aligned from the movable frame 160 to right side. The second vertical driving source 171B includes driving sources 171DL, 171CL, 171BL and 171AL aligned from left side to the movable frame 160.

Each of the driving sources 171AR, 171BR, 171CR and 171DR of the first vertical driving source 171A includes a lower electrode, a thin film of piezo-electric element and an upper electrode formed in this order on the respective rectangular beam of the first vertical driving beam 170A. Similarly, each of the driving sources 171DL, 171CL, 171BL and 171AL of the second vertical driving source 171B includes a lower electrode, a thin film of piezo-electric element and an upper electrode formed in this order on the respective rectangular beam of the second vertical driving beam 170B.

In the first vertical driving beam 170A and the second vertical driving beam 170B, by applying driving voltages of different polarities to the adjacent driving sources of the adjacent rectangular beams, the adjacent rectangular beams are warped in the opposite directions in the upper and lower direction. Thus, the accumulated movement of the rectangular beams in the upper and lower direction is transmitted to the movable frame 160. The first vertical driving beam 170A and the second vertical driving beam 170B oscillate the mirror 110 in the vertical direction, which is perpendicular to the horizontal direction by this operation. For example, for driving the first vertical driving beam 170A and the second vertical driving beam 170B in the vertical direction, a non-resonance frequency may be used.

At this time, by driving the driving sources 171AR and 171AL and the driving sources 171CR and 171CL (4 in total) by the same waveform, and the driving sources 171BR and 171BL and the driving sources 171DR and 171DL (4 in total) by the waveform with different phase from that for the driving sources 171AR and 171AL and the driving sources 171CR and 171CL, the mirror 110 can be oscillated in the vertical direction.

The optical scanner apparatus 100 of the embodiment further includes piezo-electric sensors 191, 192, 193 and 194 which detect an inclination of the mirror 110 in the horizontal direction when the mirror 110 is oscillated in the horizontal direction by applying driving voltage to the first horizontal driving source 151A and the second horizontal driving source 151B. The piezo-electric sensors 191 and 192 are provided at the connecting beam 140B and the piezo-electric sensors 193 and 194 are provided at the connecting beam 140A.

The optical scanner apparatus 100 of the embodiment further includes piezo-electric sensors 195 and 196 which detect an inclination of the mirror 110 in the vertical direction when the mirror 110 is oscillated in the vertical direction by applying driving voltage to the first vertical driving source 171A and the second vertical driving source 171B. The piezo-electric sensor 195 is provided to one of the rectangular beams of the first vertical driving beam 170A, and the piezo-electric sensor 196 is provided to one of the rectangular beams of the second vertical driving beam 170B.

The piezo-electric sensors 191 and 192 of the embodiment output current values corresponding to a displacement of the connecting beam 130B which is transmitted from the torsion beam 130B in accordance with the inclination of the mirror 110 in the horizontal direction, respectively. The piezo-electric sensors 193 and 194 of the embodiment output current values corresponding to a displacement of the connecting beam 140A which is transmitted from the torsion beam 130A in accordance with the inclination of the mirror 110 in the horizontal direction, respectively.

The piezo-electric sensor 195 (an example of a second piezo-electric sensor) of the embodiment outputs a current value corresponding to a displacement of the respective rectangular beam at which the piezo-electric sensor 195 is provided, among the plural driving beams of the first vertical driving beam 170A in accordance with the inclination of the mirror 110 in the vertical direction. The piezo-electric sensor 196 (an example of a third piezo-electric sensor) of the embodiment outputs a current value corresponding to a displacement of the respective rectangular beam at which the piezo-electric sensor 196 is provided, among the plural driving beams of the second vertical driving beam 170B in accordance with the inclination of the mirror 110 in the vertical direction.

In this embodiment, the inclination of the mirror 110 in the horizontal direction is detected using an output of one of the piezo-electric sensors 191 to 194. Further in this embodiment, the inclination of the mirror 110 in the vertical direction is detected using an output of one of the piezo-electric sensors 195 and 196.

Further in this embodiment, an inclination detection unit that detects an inclination of the mirror 110 based on the current value output from each of the piezo-electric sensors may be provided outside the optical scanner apparatus 100. Further in this embodiment, a drive control unit that controls driving voltages to be supplied to the first horizontal driving source 151A, the second horizontal driving source 151B, the first vertical driving source 171A and the second vertical driving source 171B, based on a detected result by the inclination detection unit may be provided outside the optical scanner apparatus 100.

Each of the piezo-electric sensors 191 to 196 includes a lower electrode, a thin film of piezo-electric element and an upper electrode formed in this order. In this embodiment, outputs from the piezo-electric sensors 191 to 196 are current values of sensor interconnects which are connected to the upper electrodes and the lower electrodes, respectively.

Figure 2:
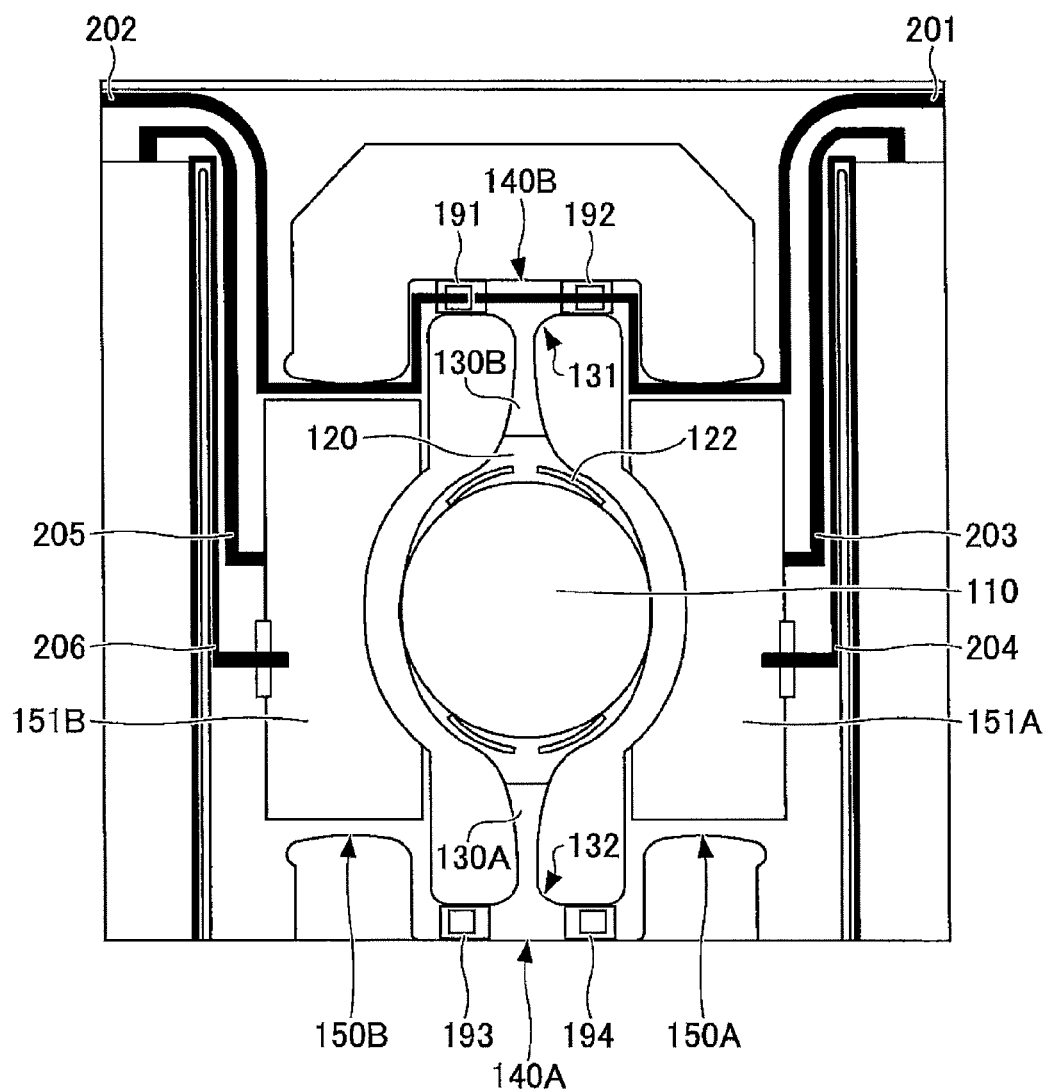
FIG. 2 is an enlarged view of a part "A" shown in FIG. 1.

In FIG. 1, an example where the piezo-electric sensor 191 (an example of a piezo-electric sensor) is used for detecting the inclination of the mirror 110 in the horizontal direction is shown. With reference to FIG. 2, the piezo-electric sensor 191 is explained. FIG. 2 is an enlarged view of a part "A" shown in FIG. 1.

The piezo-electric sensor 191 is placed at a connecting portion 131 between the connecting beam 140B and the torsion beam 130B in the connecting beam 140B and at a driving source 151B side. The piezo-electric sensor 192 is also placed at the connecting portion 131 and at a driving source 151A side. The piezo-electric sensor 193 is placed at a connecting portion 132 between the connecting beam 140A and the torsion beam 130A in the connecting beam 140A and at a driving source 151B side. The piezo-electric sensor 194 is placed at the connecting portion 132 and at a driving source 151A side.

Each of the piezo-electric sensors 191 and 192 includes a lower electrode, a thin film of piezo-electric element, and an upper electrode formed in this order on the connecting beam 140B, respectively. Each of the piezo-electric sensors 193 and 194 includes a lower electrode, a thin film of piezo-electric element, and an upper electrode formed in this order on the connecting beam 140A, respectively.

Further in this embodiment, only an output from the piezo-electric sensor 191 is used. Thus, a first sensor interconnect 201 and a second sensor interconnect 202 are only connected to the piezo-electric sensor 191. In this example, the piezo-electric sensors 192 to 194 are dummy sensors for balancing the weights of the first connecting beam 140A and the second connecting beam 140B.

The first sensor interconnect 201 is a lower electrode interconnect which is connected to the lower electrode of the piezo-electric sensor 191. The second sensor interconnect 202 is an upper electrode interconnect which is connected to the upper electrode of the piezo-electric sensor 191.

The first sensor interconnect 201 is extended toward a first horizontal driving beam 150A side from the piezo-electric sensor 191, while the second sensor interconnect 202 is extended toward a second horizontal driving beam 150B side from the piezo-electric sensor 191. In other words, in this embodiment, the first sensor interconnect 201 and the second sensor interconnect 202 are extended toward right and left directions of the piezo-electric sensor 191 such that the first sensor interconnect 201 and the second sensor interconnect 202 are extended toward opposite directions from the piezo-electric sensor 191.

The first sensor interconnect 201 of the embodiment is led along a first drive interconnect for lower 203 for applying the driving voltage to the lower electrode of the first horizontal driving source 151A and a first drive interconnect for upper 204 (an example of a first drive interconnect) for applying the driving voltage to the upper electrode of the first horizontal driving source 151A, and is connected to a terminal included in group of terminals TA provided at a right side of the fixed frame 180.

The second sensor interconnect 202 of the embodiment is led along a second drive interconnect for lower 205 for applying the driving voltage to the lower electrode of the second horizontal driving source 151B and a second drive interconnect for upper 206 (an example of a second drive interconnect) for applying the driving voltage to the upper electrode of the second horizontal driving source 151B, and is connected to a terminal included in group of terminals TB provided at a left side of the fixed frame 180.

In this embodiment, the terminal connected to the first sensor interconnect 201 in the group of terminals TA, and the terminal connected to the second sensor interconnect 202 in the group of terminals TB may be connected to the inclination detection unit that detects the inclination of the mirror 10 in the horizontal direction. Further in this embodiment, the terminals respectively connected to the first drive interconnect for lower 203 and the first drive interconnect for upper 204 in the group of terminals TA, and the terminals respectively connected to the second drive interconnect for lower 205 and the second drive interconnect for upper 206 in the group of terminals TB may be connected to the drive control unit.

Further in this embodiment, the length of a part of the first sensor interconnect 201 which extends along the first drive interconnect for lower 203 and the first drive interconnect for upper 204 and the length of a part of the second sensor interconnect 202 which extends along the second drive interconnect for lower 205 and the second drive interconnect for upper 206 are configured to be the same.

In this embodiment, by structuring the first sensor interconnect 201 and the second sensor interconnect 202 as described above, the noises caused by the first horizontal driving source 151A and the second horizontal driving source 151B which are driven by the driving signals (voltages) whose phases are opposite from each other are canceled from each other so that the output of the piezo-electric sensor 191 can be precisely detected. Thus, in this embodiment, the inclination of the mirror 110 in the horizontal direction detected by the output of the piezo-electric sensor 191 can be precisely detected.

Figure 3:
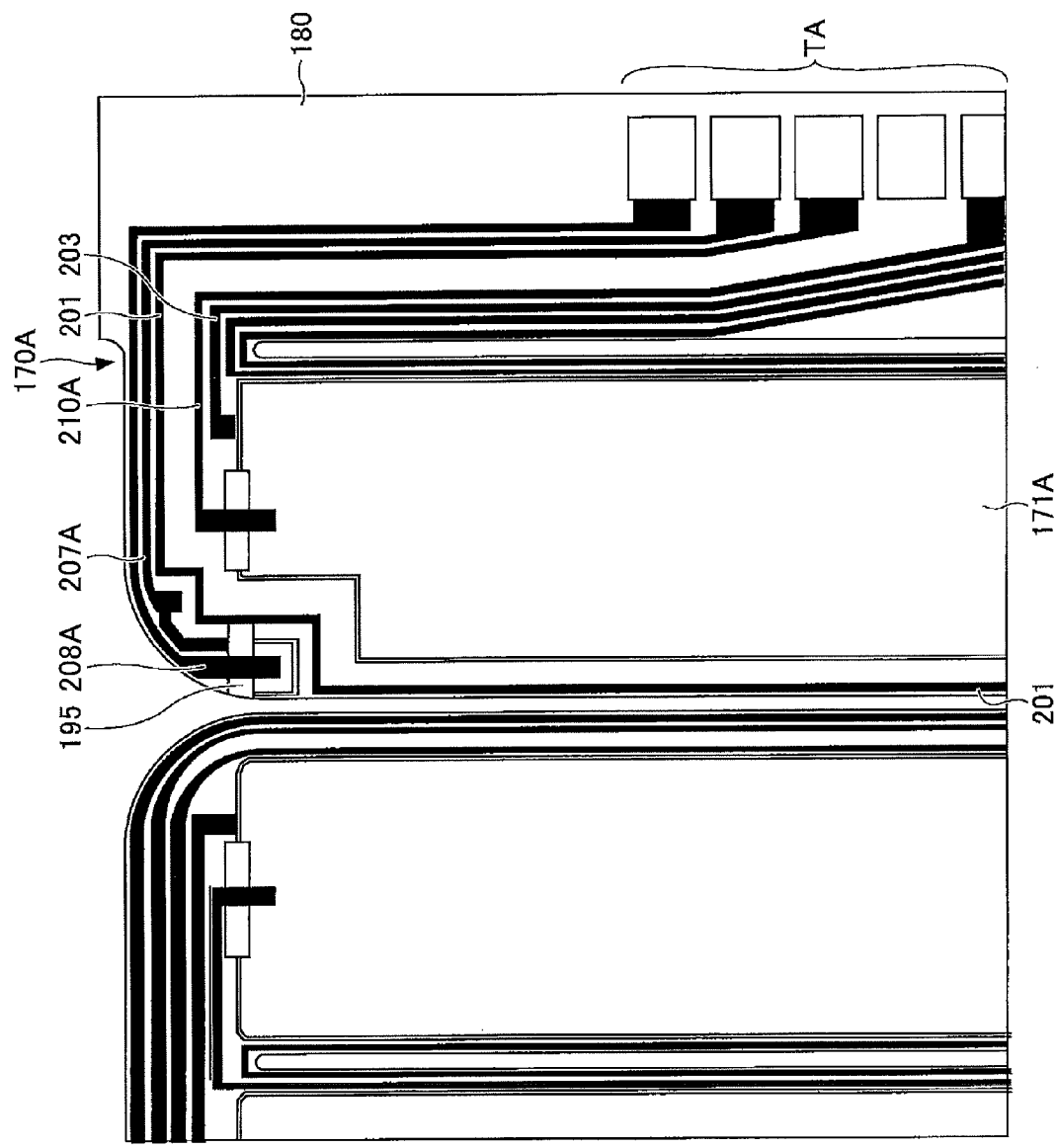
FIG. 3 is an enlarged view of a part "B" shown in FIG. 1.

With reference to FIG. 3, the piezo-electric sensor 195 is explained. FIG. 3 is an enlarged view of a part "B" shown in FIG. 1.

The piezo-electric sensor 195 is provided at an upper end portion of one of the rectangular beams of the first vertical driving beam 170A. The piezo-electric sensor 195 includes a lower electrode, a thin film of piezo-electric element, and an upper electrode formed in this order on a surface of the respective rectangular beam of the first vertical driving beam 170A.

The output of the piezo-electric sensor 195 is output from a third sensor interconnect 207A and a fourth sensor interconnect 208A. The third sensor interconnect 207A is a lower electrode interconnect which is connected to the lower electrode of the piezo-electric sensor 195. The fourth sensor interconnect 208A is an upper electrode interconnect which is connected to the upper electrode of the piezo-electric sensor 195. The third sensor interconnect 207A and the fourth sensor interconnect 208A are connected to terminals included in the group of terminals TA, respectively.

The third sensor interconnect 207A and the fourth sensor interconnect 208A of the embodiment are led along the first drive interconnect for lower 203 for applying the driving voltage to the lower electrode of the first vertical driving source 171A (and the lower electrode of the first horizontal driving source 151A) and a third drive interconnect for upper 210A for applying the driving voltage to the upper electrode of the first vertical driving source 171A. As a common driving voltage is applied to the lower electrode of the first horizontal driving source 151A and the lower electrode of the first vertical driving source 171A, the first drive interconnect for lower 203 is commonly used for the lower electrode of the first horizontal driving source 151A and the first vertical driving source 171A.

Although the third sensor interconnect 207A and the fourth sensor interconnect 208A extend along the first drive interconnect for lower 203 and the third drive interconnect for upper 210A, the first sensor interconnect 201 is formed to extend between the third sensor interconnect 207A and the fourth sensor interconnect 208A, and the first drive interconnect for lower 203 and the third drive interconnect for upper 210A. Thus, the distance between the third sensor interconnect 207A and the fourth sensor interconnect 208A, and the first drive interconnect for lower 203 and the third drive interconnect for upper 210A can be widened to a certain degree.

In this embodiment, by structuring the third sensor interconnect 207A and the fourth sensor interconnect 208A as described above, the inclination of the mirror 110 in the vertical direction detected by the output of the piezo-electric sensor 195 can be precisely detected.

Only the piezo-electric sensor 195 is explained with reference to FIG. 3, the piezo-electric sensor 196 has a similar structure as that of the piezo-electric sensor 195. The piezo-electric sensor 196 is provided at an upper end portion of one of the rectangular beams of the second vertical driving beam 170B.

In this embodiment, according to the above structure, crosstalk from the drive interconnects can be reduced so that the inclination of the mirror 110 can be precisely detected.

Second Embodiment

The second embodiment is explained with reference to drawings. The second embodiment is different from the first embodiment that a guard pattern is provided between the sensor interconnect and the drive interconnect. In the following explanation, the same components are given the same reference numerals, and explanations are not repeated.

Figure 4:
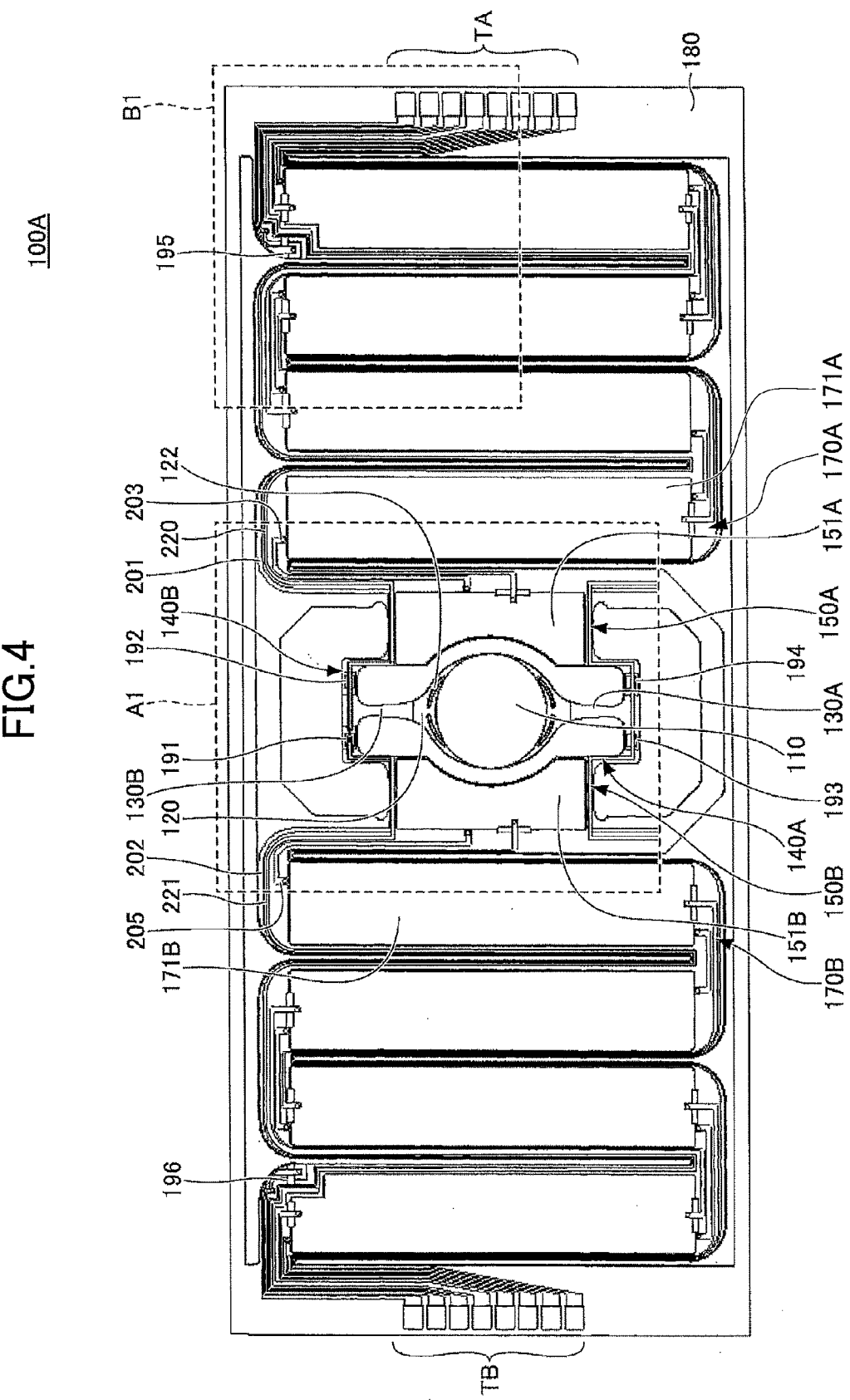
FIG. 4 is a view showing an example of an optical scanner apparatus of an embodiment.

FIG. 4 is a view showing an example of an optical scanner apparatus 100A of the second embodiment. The optical scanner apparatus 100A includes a guard pattern 220 formed between the sensor interconnects (the first sensor interconnect 201) and the drive interconnects (first drive interconnect for lower 203). Further, the optical scanner apparatus 100A includes a guard pattern 221 formed between the second sensor interconnect 202 and the second drive interconnect for lower 205.

Figure 5:
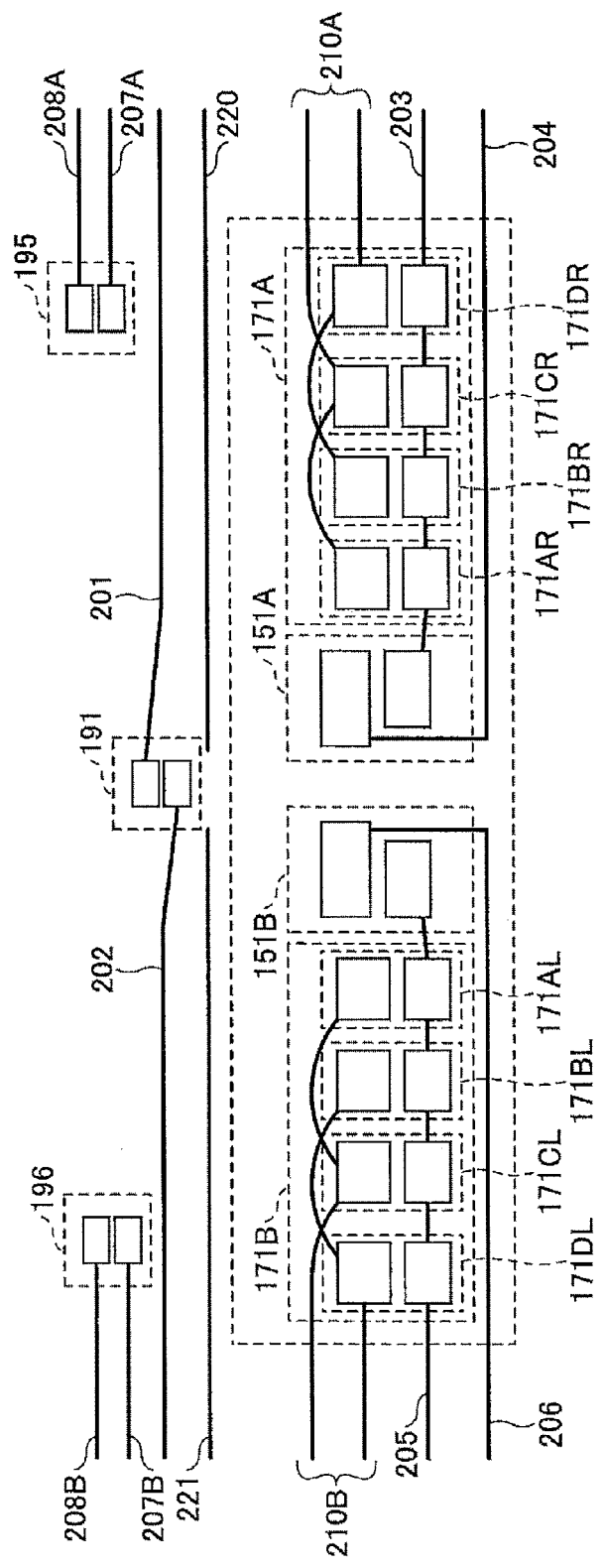
FIG. 5 is a view showing an example of guard patterns.

With reference to FIG. 5, the guard patterns 220 and 221 of the embodiment are explained. FIG. 5 is a view showing an example of the guard patterns 220 and 221. In FIG. 5, interconnects which are connected to the group of terminals TA or the group of terminals TB are shown, for example.

The first sensor interconnect 201 connected to the lower electrode of the piezo-electric sensor 191, the third sensor interconnect 207A connected to the lower electrode of the piezo-electric sensor 195, the fourth sensor interconnect 208A connected to the upper electrode of the piezo-electric sensor 195 are connected to the group of terminals TA. Further, the first drive interconnect for lower 203 connected to the lower electrode of the first horizontal driving source 151A and the lower electrode of the first vertical driving source 171A, the first drive interconnect for upper 204 connected to the upper electrode of the first horizontal driving source 151A, and the fifth drive interconnects 210A connected to the upper electrodes of the first vertical driving source 171A are connected to the group of terminals TA. The guard pattern 220 is also connected to the group of terminals TA.

The second sensor interconnect 202 connected to the upper electrode of the piezo-electric sensor 191, a fifth sensor interconnect 207B connected to the lower electrode of the piezo-electric sensor 196, and a sixth sensor interconnect 208B connected to the upper electrode of the piezo-electric sensor 196 are connected to the group of terminals TB. Further, the second drive interconnect for lower 205 connected to the lower electrode of the second horizontal driving source 151B and the lower electrode of the second vertical driving source 171B, the second drive interconnect for upper 206 connected to the upper electrode of the second horizontal driving source 151B, and a fourth drive interconnect for upper 210B connected to the upper electrode of the second vertical driving source 171B are connected to the group of terminals TB. The guard pattern 221 is also connected to the group of terminals TB.

The guard patterns 220 and 221 of the embodiment are connected to ground terminals in the group of terminals TA and in the group of terminals TB, respectively.

Figure 6:
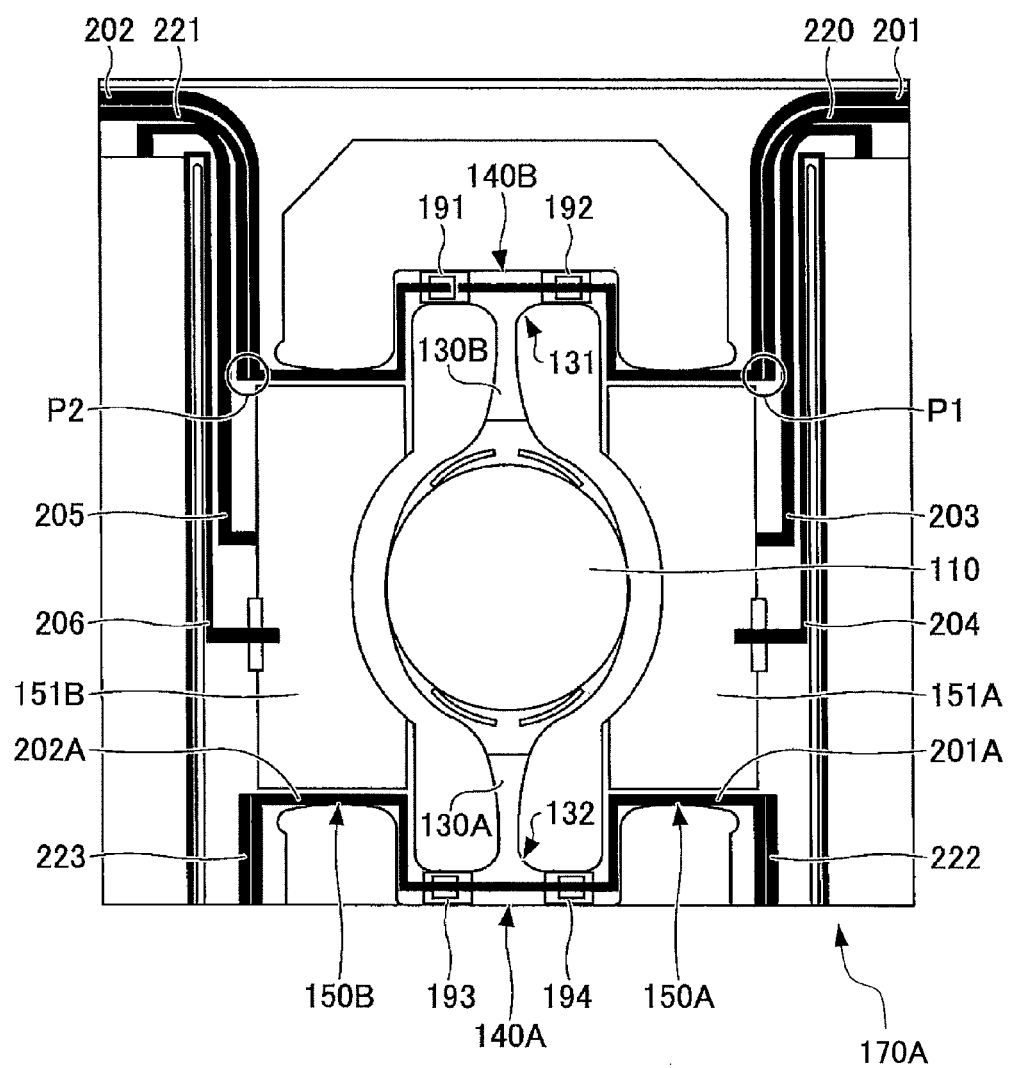
FIG. 6 is an enlarged view of a part "A1" shown in FIG. 4.
Figure 7:
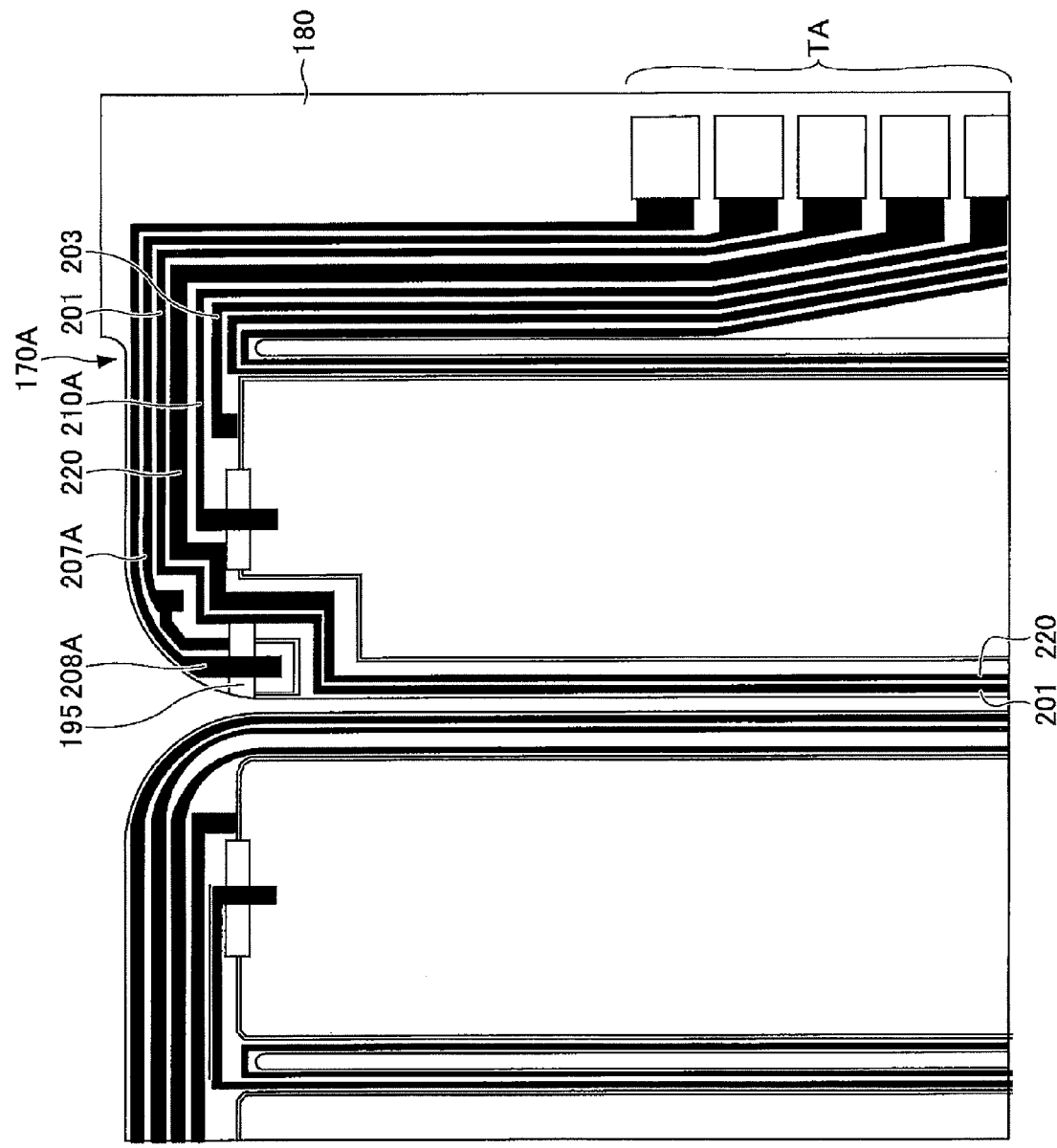
FIG. 7 is an enlarged view of a part "B1" shown in FIG. 4.

With reference to FIG. 6 and FIG. 7, positions where the guard patterns 220 and 221 of the embodiment are formed are explained.

FIG. 6 is an enlarged view of a part "A1" shown in FIG. 4.

The guard pattern 220 of the embodiment is formed from a position P1 where the first sensor interconnect 201 reaches the first vertical driving beam 170A via the first horizontal driving beam 150A. At the position P1, the first sensor interconnect 201 is started to extend along the first drive interconnect for lower 203. Thus, the guard pattern 220 is formed between the first sensor interconnect 201 and the first drive interconnect for lower 203 where these interconnects extend along with each other.

The guard pattern 221 of the embodiment is formed from a position P2 where the second sensor interconnect 202 reaches the second vertical driving beam 170B via the second horizontal driving beam 150B. At the position P2, the second sensor interconnect 202 is started to extend along the third drive interconnect 203. Thus, the guard pattern 221 is formed between the second sensor interconnect 202 and the second drive interconnect for lower 205 where these interconnects extend along with each other.

Further, in this embodiment, a first dummy sensor interconnect 201A and a second dummy sensor interconnect 202A, which have corresponding structures as the first sensor interconnect 201 and the second sensor interconnect 202, are formed at a connecting beam 140A side. Further, in this embodiment, dummy guard patterns 222 and 223 are formed at a first dummy sensor interconnect 201A side and a second dummy sensor interconnect 202A side as dummies of the guard patterns 220 and 221, respectively.

In this embodiment, by forming the first dummy sensor interconnect 201A, the second dummy sensor interconnect 202A and the dummy guard patterns 222 and 223, the weights of the first horizontal driving beam 150A and the second horizontal driving beam 150B are balanced so that the driving forces can be precisely transmitted to the mirror 110.

FIG. 7 is an enlarged view of a part "B1" shown in FIG. 4. The guard pattern 220 of the embodiment is formed along the first sensor interconnect 201 which is formed from the position P1 (see FIG. 6) toward the group of terminals TA. Further, the third drive interconnect for upper 210A connected to the upper electrode of the first vertical driving source 171A extends from the vicinity of the piezo-electric sensor 195 toward the group of terminals TA. Further, the third sensor interconnect 207A and the fourth sensor interconnect 208A are also extend from the piezo-electric sensor 195 toward the group of terminals TA. Thus, the guard pattern 220 of the embodiment is formed to extend between the sensor interconnects (the first sensor interconnect 201, the third sensor interconnect 207A and the fourth sensor interconnect 208A) and the drive interconnects (the third drive interconnect for upper 210A and the first drive interconnects 203). Specifically, the guard pattern 220 is formed to extend between the first sensor interconnect 201 and the third drive interconnect for upper 210A from the vicinity of the piezo-electric sensor 195.

Only the piezo-electric sensor 195 side is explained with reference to FIG. 7, the guard pattern 221 is similarly formed at the piezo-electric sensor 196 side.

In this embodiment, as described above, by forming the guard patterns 220 and 221, influences from the drive interconnects to the sensor interconnects can be suppressed so that the inclination of the mirror 110 can be precisely detected.

Third Embodiment

The third embodiment is explained with reference to drawings. The third embodiment is different from the second embodiment that the guard pattern is only provided from the vicinities of the piezo-electric sensors 195 and 196, respectively. In the following explanation, the same components are given the same reference numerals, and explanations are not repeated.

Figure 8:
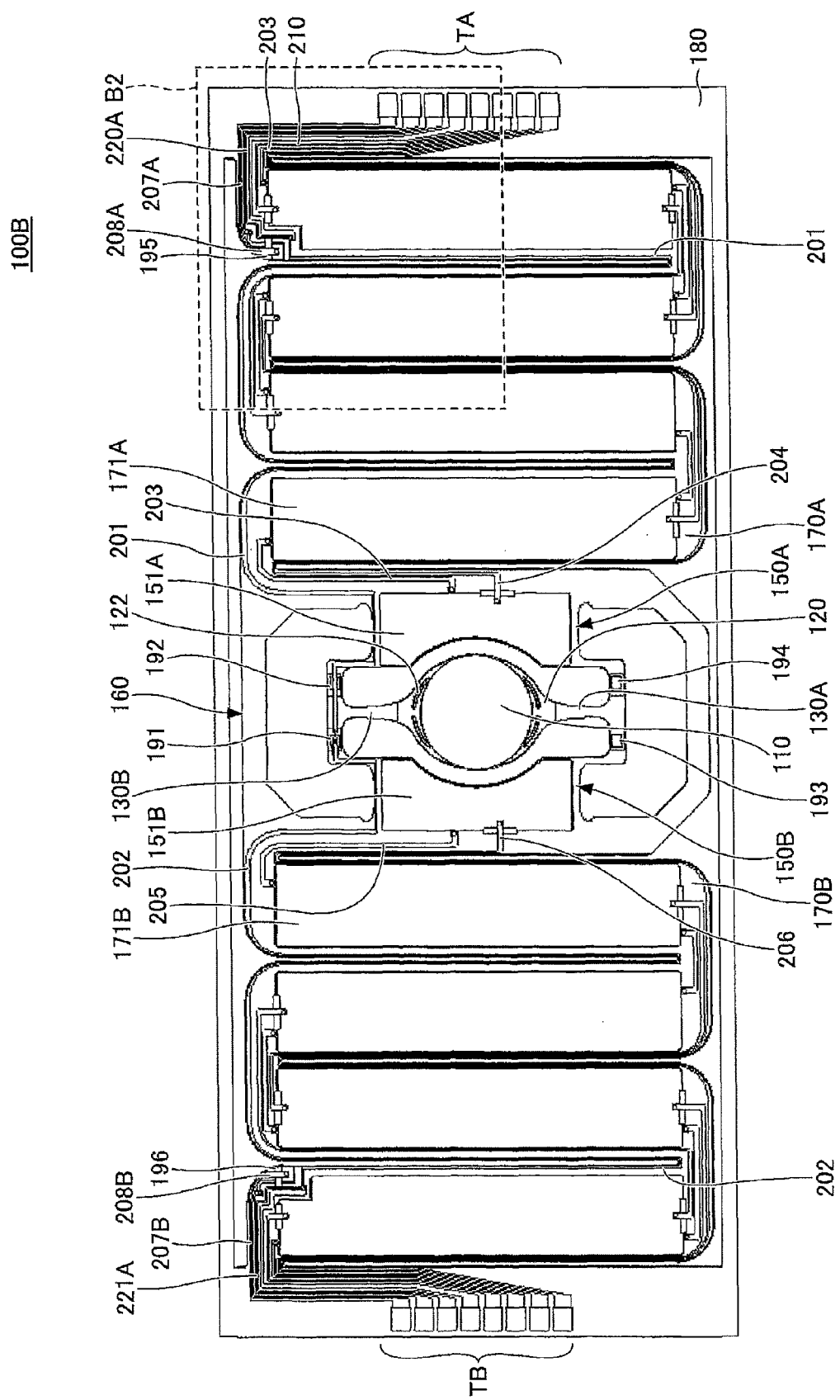
FIG. 8 is a view showing an example of an optical scanner apparatus of an embodiment.

FIG. 8 is a view showing an example of an optical scanner apparatus 100B of the third embodiment. The optical scanner apparatus 100B includes a guard pattern 220A and a guard pattern 221A at the piezo-electric sensor 195 side and the piezo-electric sensor 196 side, respectively.

Figure 9:
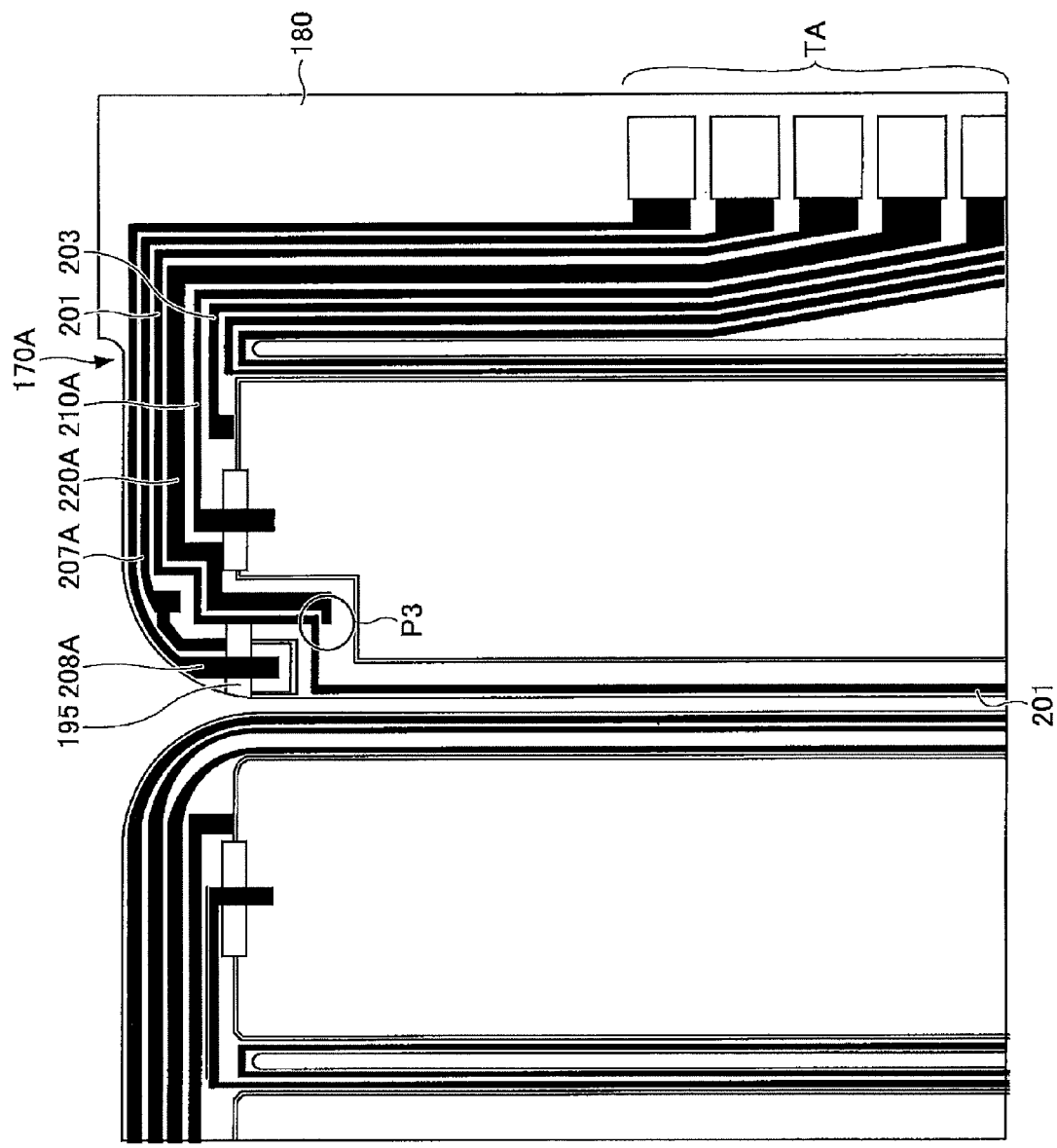
FIG. 9 is an enlarged view of a part "B2" shown in FIG. 8.

FIG. 9 is an enlarged view of a part B2 shown in FIG. 8.

In this embodiment, the guard pattern 220A which extends along the first sensor interconnect 201 connected to the piezo-electric sensor 191 is formed from a position P3 which is in the vicinity of the piezo-electric sensor 195. The position P3 is almost the same as a starting point of the third sensor interconnect 207A and the fourth sensor interconnect 208A to be extended along the first sensor interconnect 201, for example.

Although only the guard pattern 220A formed from the vicinity of the piezo-electric sensor 195 is explained with reference to FIG. 9, the guard pattern 221A is similarly formed from the vicinity of the piezo-electric sensor 196 at the piezo-electric sensor 196 side.

In this embodiment, with the above structure, noise can be reduced so that the inclination of the mirror 110 can be precisely detected.

Fourth Embodiment

The fourth embodiment is explained with reference to drawings. In the fourth embodiment, the inclination of the mirror 10 can be more precisely detected by generating a noise equality component which is equal to a noise component generated by the driving signals from the driving signal and subtracting the generated noise equality component from the output of the piezo-electric sensor. Here, the noise component is slightly generated by the length of the drive interconnects or a space between the interconnects caused by the driving signals. In the following explanation, the same components are given the same reference numerals, and explanations are not repeated.

Figure 10:
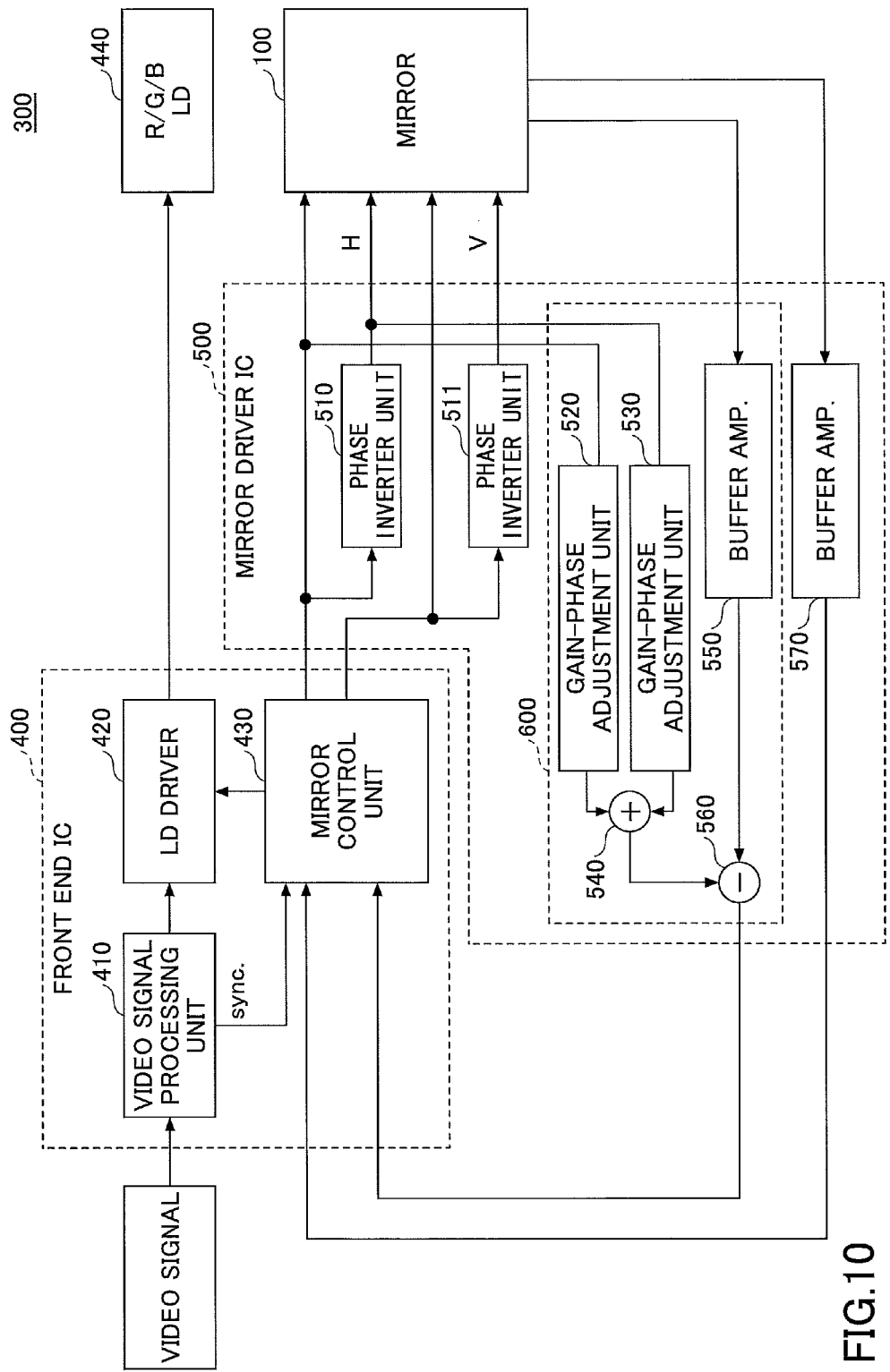
FIG. 10 is a block diagram showing an example of an optical scanner apparatus of an embodiment.

FIG. 10 is a block diagram showing an example of an optical scanner control apparatus 300 of the fourth embodiment. The optical scanner control apparatus 300 of the embodiment includes a front end Integrated Circuit (IC) 400, a Laser Diode (LD) 440, and a mirror driver IC 500 in addition to the optical scanner apparatus 100 of the first embodiment.

The front end IC 400 of the embodiment performs signal process on an input video signal and provides it to the LD 440. The front end IC 400 of the embodiment provides a signal for controlling oscillation of the mirror 110 to the optical scanner apparatus 100.

The front end IC 400 of the embodiment includes a video signal processing unit 410, an LD driver 420, and a mirror control unit 430. The video signal processing unit 410 divides the video signal into a synchronizing signal, a luminance signal and a chromaticity signal. The video signal processing unit 410 provides the luminance signal and the chromaticity signal to the LD driver 420 and provides the synchronizing signal to the mirror control unit 430.

The LD driver 420 controls the LD 440 based on the signal provided from the video signal processing unit 410.

The mirror control unit 430 controls to oscillate the mirror 110 based on the output signal of the piezo-electric sensor 191 output from the mirror driver IC 500 and the synchronizing signal. Specifically, the mirror control unit 430 outputs driving voltages (referred to as "driving signals" hereinafter) of the first horizontal driving source 151A, the second horizontal driving source 151BB, the first vertical driving source 171A, and the second vertical driving source 171B of the optical scanner apparatus 100 via the mirror driver IC 500.

The mirror driver IC 500 of the embodiment includes a phase inverter units 510 and 511, a buffer 570, and a noise reduction unit 600.

The phase inverter units 510 and 511 invert the phases of the driving signals output from the mirror control unit 430, respectively. Specifically, the phase inverter unit 510 inverts the phase of the driving signal to be provided to the first horizontal driving source 151A to form a driving signal for the second horizontal driving source 151B. The phase inverter unit 511 inverts the phase of the driving signal to be provided to the first vertical driving source 171A to form a driving signal for the second vertical driving source 171B.

The noise reduction unit 600 of the embodiment reduces a noise component which is superposed on the output of the piezo-electric sensor 191. The noise component is a crosstalk component of which a slight amount is generated by the length of the drive interconnects or a space between the interconnects caused by the driving signals provided to the first horizontal driving source 151A, the second horizontal driving source 151B, the first vertical driving source 171A, and the second vertical driving source 171B.

The noise reduction unit 600 shown in FIG. 10 reduces the noise component caused by the driving signals provided to the first horizontal driving source 151A and the second horizontal driving source 151B. Although not shown in the drawings, the optical scanner control apparatus 300 of the embodiment further includes a noise reduction unit which reduces a noise component caused by the driving signals provided to the first vertical driving source 171A and the second vertical driving source 171B. The noise reduction unit corresponding to the first vertical driving source 171A and the second vertical driving source 171B has a similar structure as the noise reduction unit 600 shown in FIG. 10.

The noise reduction unit 600 of the embodiment includes gain-phase adjustment units 520 and 530, an adding circuit 540, a buffer 550, and a subtracting circuit 560.

The gain-phase adjustment units 520 and 530 generate components equal to the noise components superposed on the output of the piezo-electric sensor 191 from the driving signals provided to the first horizontal driving source 151A and the second horizontal driving source 151B, respectively. In the following explanation, the driving signal provided to the first horizontal driving source 151A is referred to as a first driving signal, and the driving signal provided to the second horizontal driving source 151B is referred to as a second driving signal.

The gain-phase adjustment unit 520 of the embodiment generates a component equal to the noise component superposed on the output of the piezo-electric sensor 191 when the first driving signal is applied to the first horizontal driving source 151A. The gain-phase adjustment unit 530 of the embodiment generates a component equal to the noise component superposed on the output of the piezo-electric sensor 191 when the second driving signal is applied to the second horizontal driving source 151B. The gain-phase adjustment units 520 and 530 are explained later in detail.

The adding circuit 540 adds the outputs from the gain-phase adjustment units 520 and 530. In this embodiment, by adding the outputs from the gain-phase adjustment units 520 and 530, a component equal to the noise component superposed on the output of the piezo-electric sensor 191 when the first driving signal and the second driving signal are provided to the first horizontal driving source 151A and the second horizontal driving source 151B, respectively, at the same time is generated.

The buffer 550 amplifies the output of the piezo-electric sensor 191. In this embodiment, it is assumed that only the piezo-electric sensor 191 is provided to the optical scanner apparatus 100 for detecting the inclination of the mirror 110 in the horizontal direction. The piezo-electric sensor 191 outputs a current value corresponding to the displacement of the connecting beam 140B transmitted from the torsion beam 130B in accordance with the inclination of the mirror 110 in the horizontal direction. When the output of the piezo-electric sensor 192 is also used in addition to the output of the piezo-electric sensor 191, the buffer 570 is used. However, in this embodiment, as described above, it is assumed that only the piezo-electric sensor 191 is used. Thus, in such a case, the optical scanner control apparatus 300 of the embodiment may not include the buffer 570.

The subtracting circuit 560 subtracts the output of the adding circuit 540 from the output of the buffer 550. The output of the buffer 550 of the embodiment is a signal in which a noise is superposed on the actual output of the piezo-electric sensor 191. Further, the output of the adding circuit 540 is equal to the noise component superposed on the output of the piezo-electric sensor 191. Thus, by subtracting the output of the adding circuit 540 from the output of the buffer 550, the noise component can be removed from the output of the piezo-electric sensor 191. The output of the subtracting circuit 560 is provided to the mirror control unit 430 of the front end IC 400.

Figure 11:
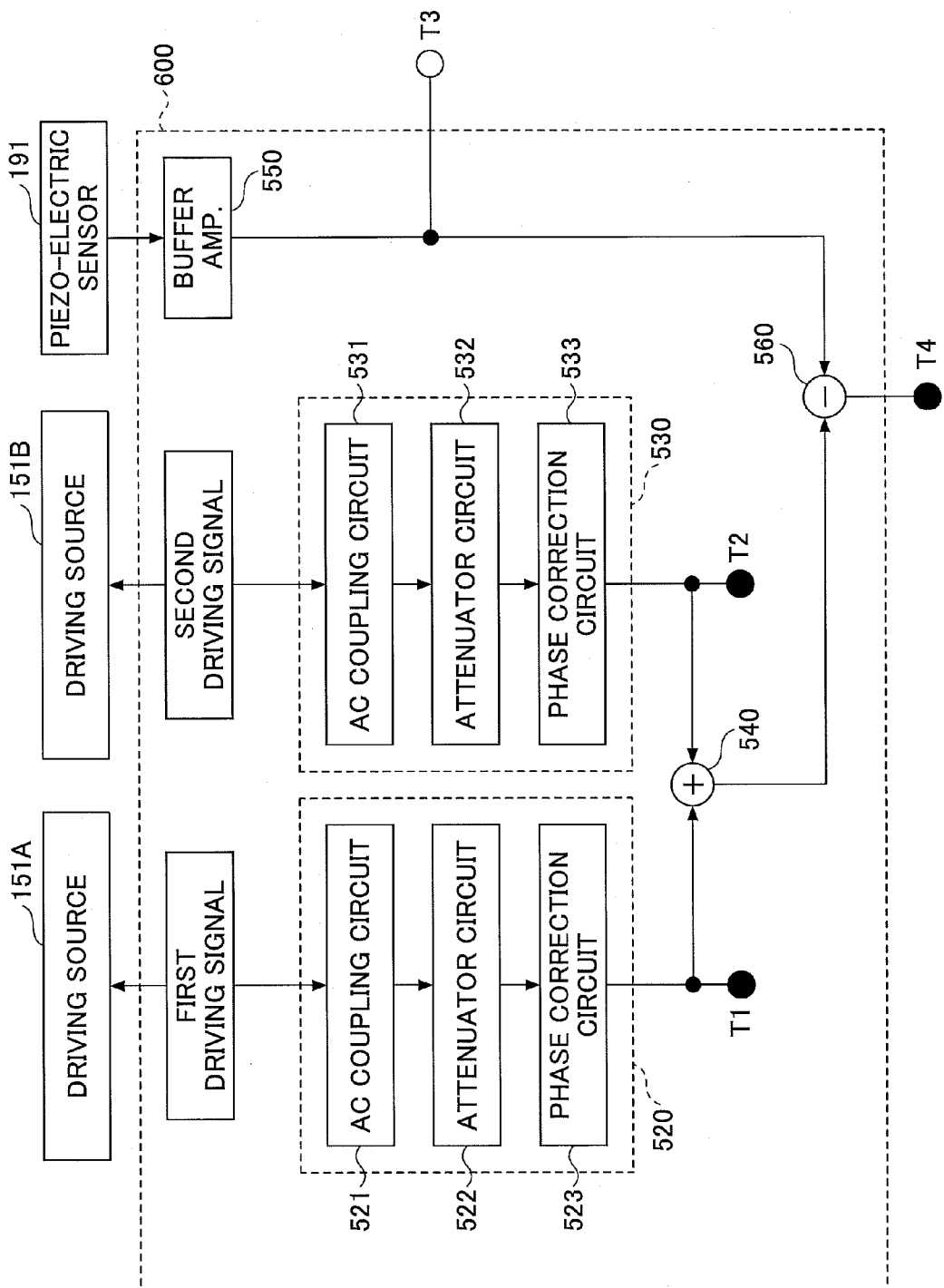
FIG. 11 is a block diagram showing an example of gain-phase adjustment units.

The gain-phase adjustment units 520 and 530 are explained. FIG. 11 is a block diagram showing an example of the gain-phase adjustment units 520 and 530.

The gain-phase adjustment unit 520 of the embodiment includes an AC coupling circuit 521, an attenuator circuit 522, and a phase correction circuit 523. Similarly, the gain-phase adjustment unit 530 of the embodiment includes an AC coupling circuit 531, an attenuator circuit 532 and a phase correction circuit 533. In this embodiment, the gain-phase adjustment unit 520 corresponds to the first driving signal, and the gain-phase adjustment unit 530 corresponds to the second driving signal. The structures of the gain-phase adjustment unit 520 and the gain-phase adjustment unit 530 are the same. Thus, in the following explanation, the structure of the gain-phase adjustment unit 520 is explained and the explanation of the gain-phase adjustment unit 530 is not repeated.

The AC coupling circuit 521 of the embodiment takes ground voltage as a reference voltage of the first driving signal. The attenuator circuit 522 changes the amplitude of the first driving signal to be equal to the amplitude of the noise component output from the piezo-electric sensor 191. The phase correction circuit 523 corrects the phase of the component generated from the first driving signal to meet the phase of the noise component.

Figure 12:
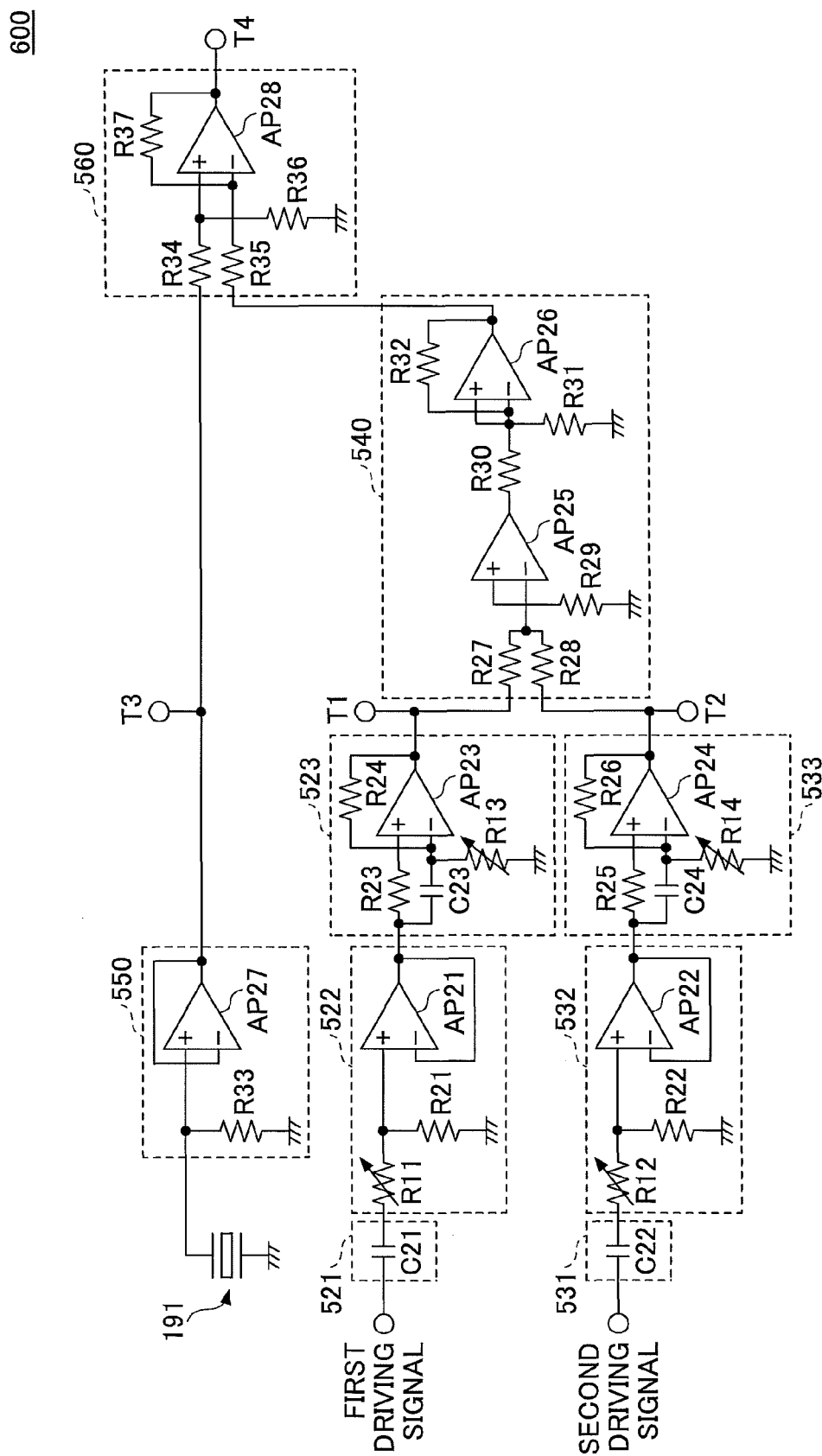
FIG. 12 is a circuit diagram showing an example of a circuit structure of a noise reduction unit of an embodiment.

With reference to FIG. 12, a circuit structure of the noise reduction unit 600 of the embodiment is explained. FIG. 12 is a circuit diagram showing an example of a circuit structure of the noise reduction unit 600 of the fourth embodiment.

The noise reduction unit 600 of the embodiment includes amplifiers AP21 to AP28, variable resistors R11 to R14, resistors R21 to R37, and capacitors C21 to C24.

The AC coupling circuit 521 of the embodiment is composed of the capacitor C21 and the AC coupling circuit 531 is composed of the capacitor C22. The first driving signal is input to one end of the capacitor C21, and the second driving signal is input to one end of the capacitor C22.

The other end of the capacitor C21 is connected to one end of the variable resistor R11, which is an input of the attenuator circuit 522. The other end of the capacitor C31 is connected to one end of the variable resistor R12, which is an input of the attenuator circuit 532.

The attenuator circuit 522 includes the variable resistor R11, the resistor R21, and the amplifier AP21. The attenuator circuit 532 includes the variable resistor R12, the resistor R22, and the amplifier AP22.

In the attenuator circuit 522, one end of the variable resistor R11 is connected to the other end of the capacitor C21, and the other end of the variable resistor R11 is connected to one end of the resistor R21. A connecting point of the variable resistor R11 and the resistor R21 is connected to a noninverting input terminal of the amplifier AP21. The other end of the resistor R21 is grounded. The output of the amplifier AP21 is connected to an inverting input terminal of the amplifier AP21 and to a connecting point of one end of the resistor R23 and one end of the capacitor C23 of the phase correction circuit 523.

In the attenuator circuit 532, one end of the variable resistor R12 is connected to the other end of the capacitor C22, and the other end of the variable resistor R12 is connected to one end of the resistor R22. A connecting point of the variable resistor R12 and the resistor R22 is connected to a noninverting input terminal of the amplifier AP22. The other end of the resistor R22 is grounded. The output of the amplifier AP22 is connected to an inverting input terminal of the amplifier AP22 and to a connecting point of one end of the resistor R25 and one end of the capacitor C24 of the phase correction circuit 533.

The phase correction circuit 523 includes the variable resistor R13, the resistors R23 and R24, the capacitor C23, and the amplifier AP23. The phase correction circuit 533 includes the variable resistor R14, the resistors R25 and R26, the capacitor C24, and the amplifier AP24.

In the phase correction circuit 523 of the embodiment, the other end of the resistor R23 is connected to a noninverting input terminal of the amplifier AP23, and a connecting point of the other end of the capacitor C23 and one end of the variable resistor R13 is connected to an inverting input terminal of the amplifier AP23. The other end of the variable resistor R13 is grounded. One end of the resistor R24 is connected to the inverting input terminal of the amplifier AP23, and the other end of the resistor R24 is connected to the output of the amplifier AP23. The output of the amplifier AP23 is connected to one end of the resistor R27 of the adding circuit 540.

In the phase correction circuit 533 of the embodiment, the other end of the resistor R25 is connected to a noninverting input terminal of the amplifier AP24, and a connecting point of the other end of the capacitor C24 and one end of the variable resistor R14 is connected to an inverting input terminal of the amplifier AP24. The other end of the variable resistor R14 is grounded. One end of the resistor R26 is connected to the inverting input terminal of the amplifier AP24, and the other end of the resistor R26 is connected to the output of the amplifier AP24. The output of the amplifier AP24 is connected to one end of the resistor R28 of the adding circuit 540.

The adding circuit 540 of the embodiment includes the resistors R27 to R32, and the amplifiers AP25 and AP26. In the adding circuit 540 of the embodiment, a connecting point of the other end of the resistor R27 and the other end of the resistor R28 is connected to an inverting input terminal of the amplifier AP25. One end of the resistor R29 is connected to a noninverting input terminal of the amplifier AP25, and the other end of the resistor R29 is grounded. The output of the amplifier AP25 is connected to one end of the resistor R30. The other end of the resistor R30 is connected to an inverting input terminal of the amplifier AP26. One end of the resistor R31 is connected to a noninverting input terminal of the amplifier AP26, and the other end of the resistor R31 is grounded. One end of the resistor R32 is connected to the inverting input terminal of the amplifier AP26, and the other end of the resistor R32 is connected to the output of the amplifier AP26. The output of the amplifier AP26 is connected to one end of the resistor R35 of the subtracting circuit 560.

The buffer 550 of the embodiment includes the resistor R33 and the amplifier AP27. One end of the resistor R33 is connected to the output of the piezo-electric sensor 191, and the other end of the resistor R33 is grounded. A connecting point of the one end of the resistor R33 and the output of the piezo-electric sensor 191 is connected to a noninverting input terminal of the amplifier AP27. The output of the amplifier AP27 is connected to an inverting input terminal of the amplifier AP27 and one end of the resistor R34 of the subtracting circuit 560.

The subtracting circuit 560 of the embodiment includes the resistors R34 to R37, and the amplifier AP28. The other end of the resistor R34 is connected to one end of the resistor R36. A connecting point of the other end of the resistor R34 and the one end of the resistor R36 is connected to a noninverting input terminal of the amplifier AP28. The other end of the resistor R36 is grounded. The other end of the resistor R35 is connected to an inverting input terminal of the amplifier AP28 and one end of the resistor R37. The other end of the resistor R37 is connected to the output of the amplifier AP28. The amplifier AP28 outputs a signal from which the noise component is removed.

With reference to FIG. 13, a process of performing an adjustment for removing the noise component from the output of the piezo-electric sensor 191 in the optical scanner control apparatus 300 of the embodiment is explained. FIG. 13 is a flowchart showing an example of a process of performing the adjustment for removing the noise component of the fourth embodiment.

In this embodiment, by adjusting amplitudes and phases of the first driving signal and the second driving signal, noise equality components, which are equal to the noise components generated by the first driving signal and the second driving signal, are generated. In this embodiment, by subtracting the noise equality components from the output of the piezo-electric sensor 191, the noise can be reduced.

Specifically, in this embodiment, the noise equality components are generated from the first driving signal and the second driving signal by adjusting the resistance values of the variable resistors R11 and R12 of the noise attenuator circuits 522 and 532 and the resistance values of the variable resistors R13 and R14 of the phase correction circuits 523 and 533, respectively. The adjustment of the resistance values may be performed when the optical scanner control apparatus 300 of the embodiment is shipped from a factory of a manufacturer or the like, for example. Further, the adjustment explained with reference to FIG. 13 may be manually performed by a manufacturer or the like of the optical scanner control apparatus 300, for example.

When the adjustment for removing the noise is performed in the optical scanner control apparatus 300 of the embodiment, the mirror control unit 430 is controlled to output only the first driving signal (step S131). At this time, the frequency of the first driving signal is set to be further away from a resonance point so that the first horizontal driving source 151A is not driven.

Subsequently, in this embodiment, the resistance value of the variable resistor R11 of the attenuator circuit 522 and the resistance value of the variable resistor R13 of the phase correction circuit 523 are adjusted (step S132). In this embodiment, by the adjustment in step S132, a first noise equality component signal is generated from the first driving signal.

Subsequently, in this embodiment, the adjustment in step S132 is repeated until the amplitude and the phase of the first noise equality component signal becomes equal to the amplitude and the phase of a first noise component output from the buffer 550 (step S133). The first noise component output from the buffer 550 is a noise component generated by the first driving signal. The comparison of the first noise equality component signal and the first noise component may be performed by connecting an oscillograph or the like to a terminal T3, which is the output of the buffer 550, and a terminal T1, which is the output of the phase correction circuit 523, and observing the oscillograph or the like, for example.

Subsequently, in this embodiment, for the second driving signal, similar steps as step S131 to step S133 are performed. In this embodiment, the mirror control unit 430 is controlled to output only the second driving signal (step S134). At this time, the frequency of the second driving signal is set to be further away from a resonance point so that the second horizontal driving source 151B is not driven. Subsequently, in this embodiment, the resistance value of the variable resistor R12 of the attenuator circuit 532 and the resistance value of the variable R14 of the resistor phase correction circuit 533 are adjusted (step S135). Subsequently, in this embodiment, by the adjustment in step S135, a second noise equality component signal is generated from the second driving signal. The adjustment in step S135 is repeated until the amplitude and the phase of the second noise equality component signal becomes equal to the amplitude and the phase of a second noise component output from the buffer 550 (step S136).

The comparison of the second noise equality component signal and the second noise component may also be performed by observing the oscillograph or the like connected to the terminal T3, which is the output of the buffer 550, and a terminal T2, which is the output of the phase correction circuit 533.

Generation of the noise equality components is further explained with reference to FIG. 14 to FIG. 16.

FIG. 14 is a view showing a waveform output from the piezo-electric sensor 191 before removing the noise.

In FIG. 14, an oscillation displacement of the mirror 110 is shown in (a). Waveforms of the first driving signal and the second driving signal are shown in (c). The waveform output from the piezo-electric sensor 191 when the first driving signal and the second driving signal whose frequencies are further away from the resonance point are applied to the first horizontal driving source 151A and the second horizontal driving source 151B, respectively, is shown in (b). In (b), "N" expresses a noise component signal generated by the first driving signal and the second driving signal.

At this time, in the optical scanner apparatus 100, the first horizontal driving source 151A and the second horizontal driving source 151B are not oscillated and the mirror 110 is not oscillated as well, as shown in (a). The component output from the piezo-electric sensor 191 includes only the noise component signal N, as shown in (b). In this embodiment, the noise component signal N is removed.

FIG. 15A and FIG. 15B are views showing an example of noise equality components. FIG. 15A shows an example of the first noise equality component signal generated from the first driving signal. FIG. 15B shows an example of the second noise equality component signal generated from the second driving signal.

In FIG. 15A, a waveform output from the piezo-electric sensor 191 when only the first driving signal is applied to the first horizontal driving source 151A is shown in (b). At this time, the component output from the piezo-electric sensor 191 includes only a noise component signal N1 generated by the first driving signal. A waveform of the first driving signal is shown in (c). A waveform of the first noise equality component signal generated from the first driving signal is shown in (a).

Similarly, in FIG. 15B, waveform output from the piezo-electric sensor 191 when only the second driving signal is applied to the second horizontal driving source 151B is shown in (b). At this time, the component output from the piezo-electric sensor 191 includes only a noise component signal N2 generated by the second driving signal. A waveform of the second driving signal is shown in (c). A waveform of the second noise equality component signal generated from the second driving signal is shown in (a).

In this embodiment, the noise component signal N (shown in FIG. 14) is an added result of the noise component signal N1 shown in (b) of FIG. 15A and the noise component signal N2 shown in (b) of FIG. 15B.

In this embodiment, the gain-phase adjustment unit 520 adjusts the amplitude and the phase of the first driving signal to generate the first noise equality component signal whose amplitude and phase are the same as those of the noise component signal N1.

In this embodiment, the gain-phase adjustment unit 530 adjusts the amplitude and the phase of the second driving signal to generate the second noise equality component signal whose amplitude and phase are the same as those of the noise component signal N2.

Thus, in this embodiment, the noise component signal N shown in FIG. 14 is an added result of the first noise equality component signal and the second noise equality component signal. Therefore, in this embodiment, by subtracting the noise component signal N from the output of the piezo-electric sensor 191 when both the first driving signal and the second driving signal are applied at the same time, the noise component signal N can be cancelled.

Figure 16:
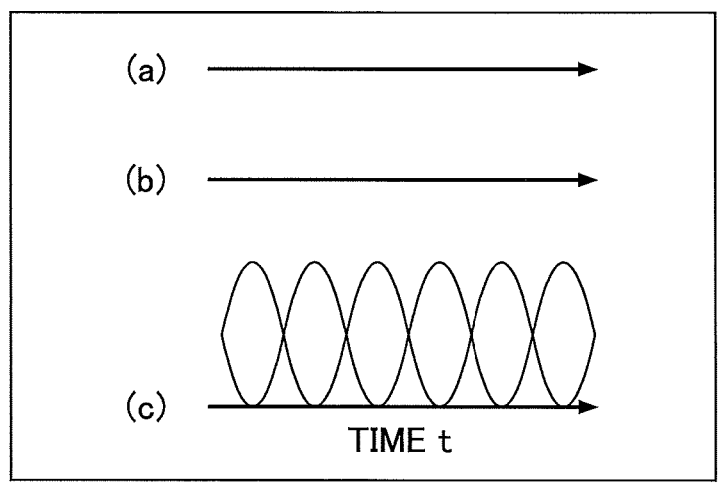
FIG. 16 is a view showing a waveform output from the piezo-electric sensor after removing the noise.

FIG. 16 is a view showing a waveform output from the piezo-electric sensor 191 after removing the noise.

In FIG. 16, similar to FIG. 14, an oscillation displacement of the mirror 110 is shown in (a). Waveforms of the first driving signal and the second driving signal are shown in (c). The waveform output from a terminal T4, which is the output of the subtracting circuit 560 in FIG. 12 when the first driving signal and the second driving signal whose frequencies are further away from the resonance point are applied to the first horizontal driving source 151A and the second horizontal driving source 151B, respectively, is shown in (b).

As shown in (b) of FIG. 16, the noise component is not included in the output of the piezo-electric sensor 191 when the first driving signal and the second driving signal are applied at the same time to the first horizontal driving source 151A and the second horizontal driving source 151B, respectively.

Thus, according to the embodiment, a noise component which is slightly generated by the length of the drive interconnects or a space between the interconnects caused by the driving signals, for example, can be removed. Thus, the inclination of the mirror can be precisely detected by reducing the noise of the sensor interconnects.

Further, in this embodiment, although the gain-phase adjustment units 520 and 530 are explained to include the phase correction circuits 523 and 533, respectively, the structures of the gain-phase adjustment units 520 and 530 are not limited. For example, when the phase of only one of the first driving signal and the second driving signal is to be adjusted, only the respective phase correction circuit may be included in the optical scanner control apparatus 300.

Figure 17:
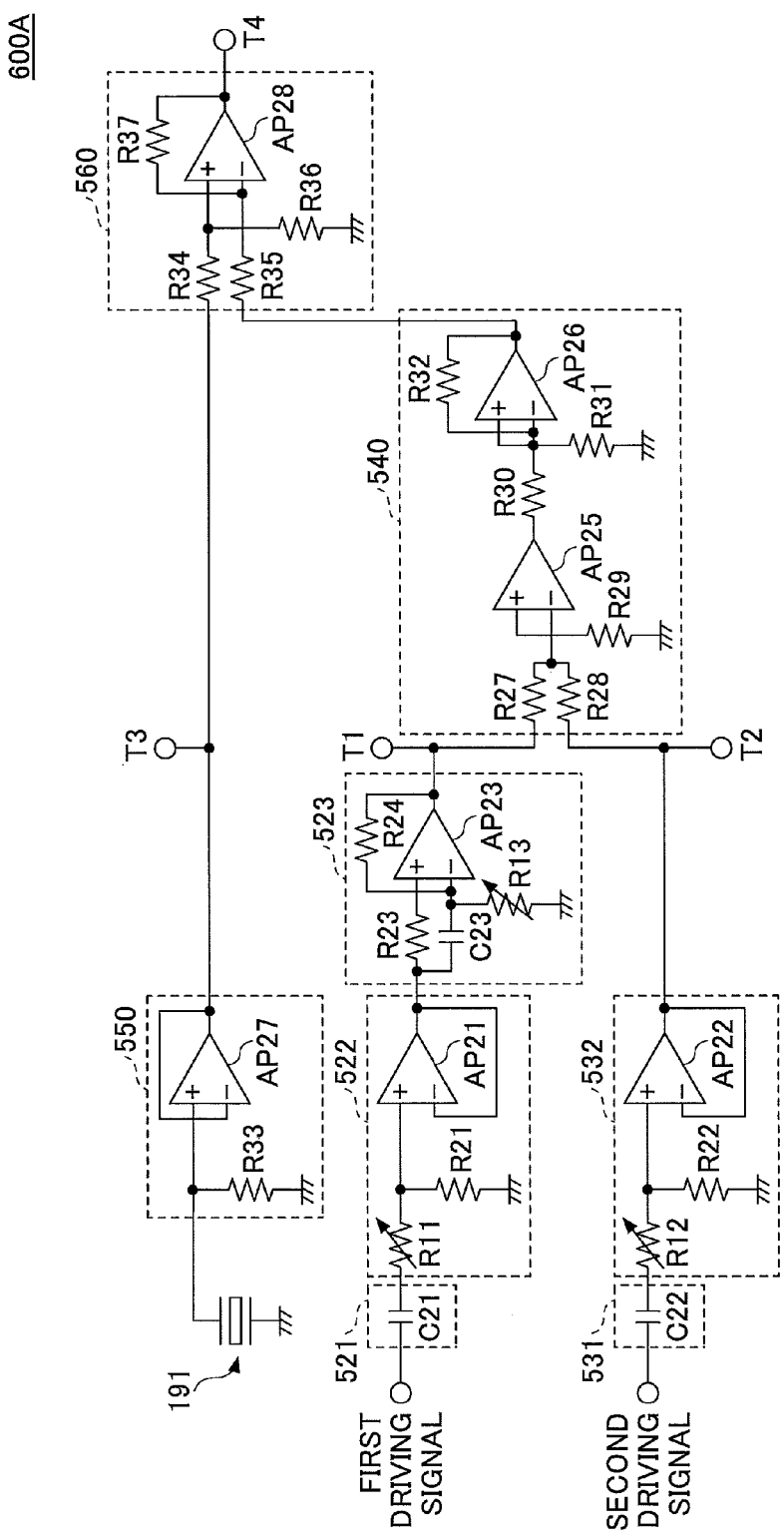
FIG. 17 is a circuit diagram showing another example of a circuit structure of a noise reduction unit of an embodiment.

FIG. 17 is a circuit diagram showing another example of a circuit structure of a noise reduction unit 600A of the fourth embodiment. In the example shown in FIG. 17, only the phase of the first driving signal is adjusted. The noise reduction unit 600A shown in FIG. 17 is different from the noise reduction unit 600 shown in FIG. 12 that the phase correction circuit 533 corresponding to the second driving signal is not included. Further, for a case where only the phase of the second driving signal is adjusted, the phase correction circuit 533 corresponding to the second driving signal may be included and the phase correction circuit 523 corresponding to the first driving signal may not be included.

Further, although the structure in which the noise is reduced when detecting the inclination of the mirror 110 in the horizontal direction is explained in the above, the noise may be reduced with a similar structure when the inclination of the mirror 110 in the vertical direction is detected.

Fifth Embodiment

The fifth embodiment is explained with reference to drawings. The fifth embodiment is different from the fourth embodiment that the adjustment for removing the noise is automatically performed. In the following explanation, the same components are given the same reference numerals, and explanations are not repeated.

Figure 18:
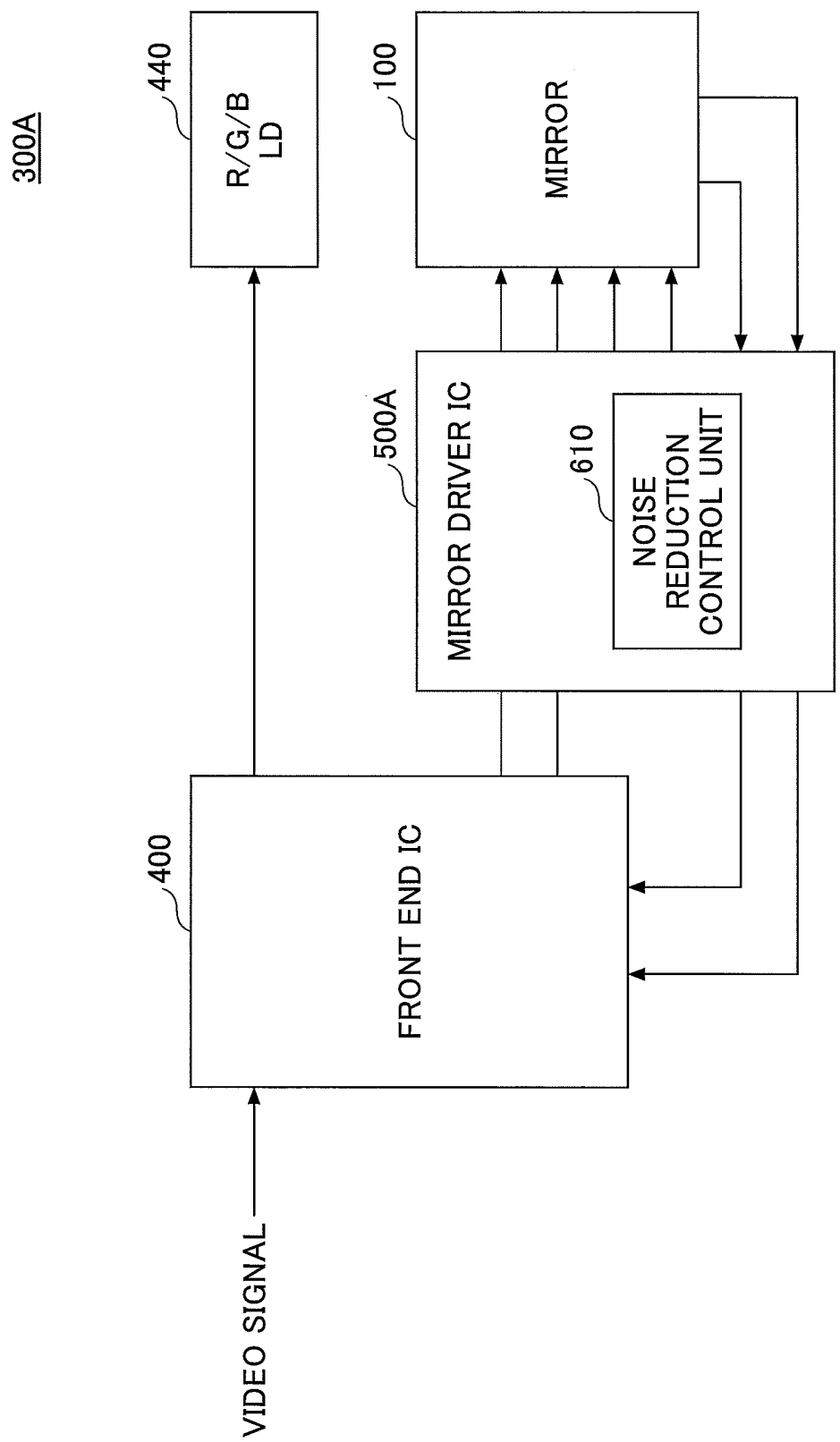
FIG. 18 is a block diagram showing an optical scanner apparatus of an embodiment.

FIG. 18 is a block diagram showing an optical scanner control apparatus 300A of the fifth embodiment. The optical scanner control apparatus 300A of the embodiment includes a mirror driver IC 500A. The mirror driver IC 500A includes a noise reduction control unit 610 that automatically performs a process of performing the adjustment for removing the noise component. The noise reduction control unit 610 of the embodiment adjusts the resistance values of the variable resistors or the like, as explained in the fourth embodiment.

Figure 19:
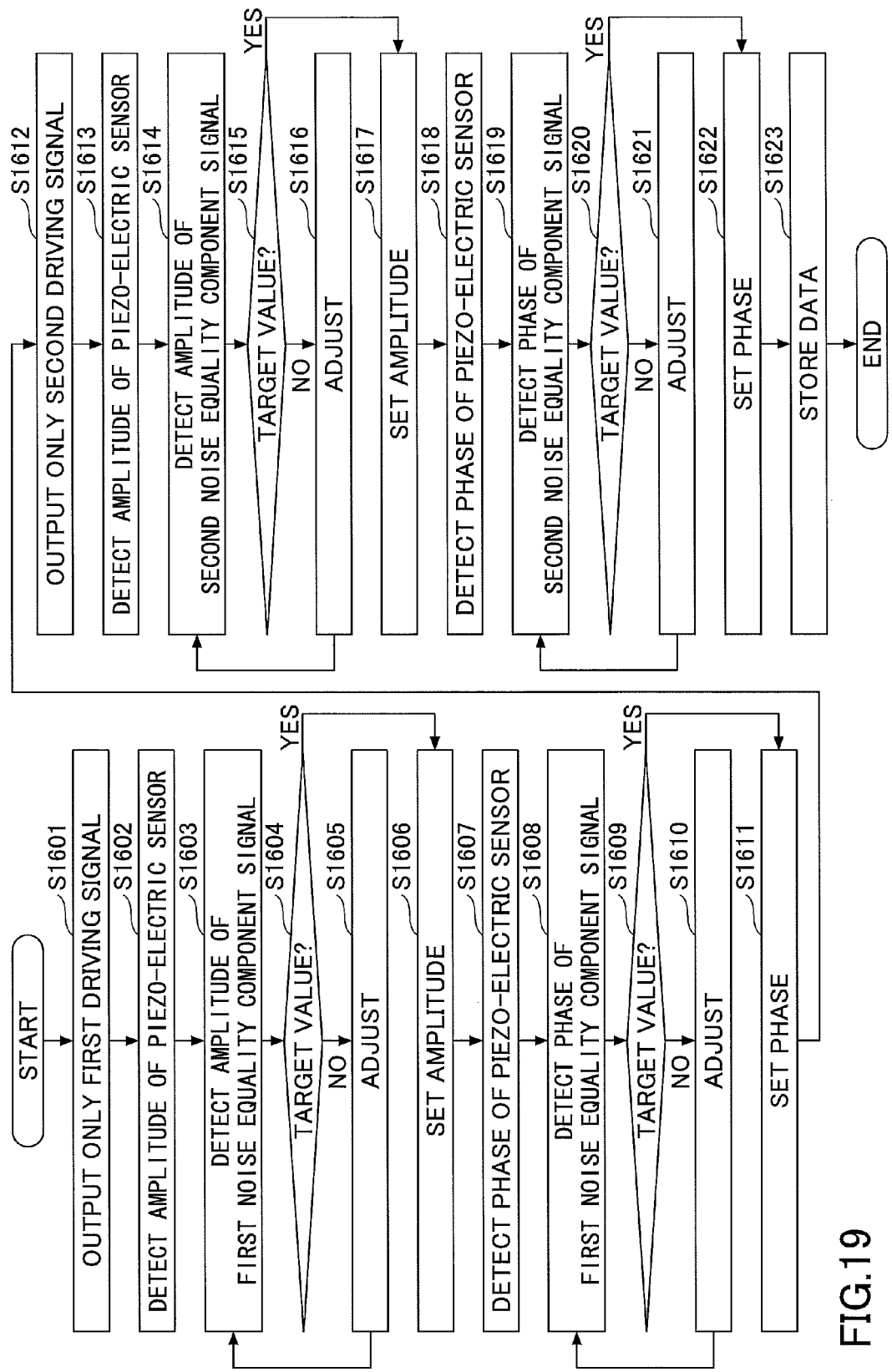
FIG. 19 is a flowchart showing an example of a process of performing an adjustment for removing a noise component of an embodiment.

FIG. 19 is a flowchart showing an example of a process of performing the adjustment for removing the noise component of the fifth embodiment. In this embodiment, the amplitude and the phase of the noise component signal N1 which is generated when only the first driving signal is applied to the first horizontal driving source 151A, and the amplitude and the phase of the noise component signal N2 when only the second driving signal is applied to the second horizontal driving source 151B are previously obtained as target values.

In this embodiment, the noise reduction control unit 610 applies only the first driving signal to the first horizontal driving source 151A (step S1601). Subsequently, the noise reduction control unit 610 detects a level of the amplitude of the output of the piezo-electric sensor 191 (which is the value output from the terminal T1 as shown in FIG. 12) (step S1602). Subsequently, the noise reduction control unit 610 detects a level of the amplitude of the first noise equality component signal, which is the value output from the terminal T1 as shown in FIG. 12 (step S1603). Subsequently, the noise reduction control unit 610 determines whether the amplitude of the first noise equality component signal is equal to the amplitude of the noise component signal N1, which is the target value (step S1604). The amplitude of the noise component signal N1 is previously stored in a storing unit or the like of the noise reduction control unit 610.

In step S1604, when the amplitude of the first noise equality component signal is not equal to the amplitude of the noise component signal N1 (NO in step S1604), the noise reduction control unit 610 adjusts a gain of the attenuator circuit 522 (step S1605). Specifically, the noise reduction control unit 610 adjusts the resistance value of the variable resistor R11 of the attenuator circuit 522.

The noise reduction control unit 610 of the embodiment repeats the processes of step S1603 to step S1605 until the amplitude of the first noise equality component signal becomes equal to the amplitude of the noise component signal N1. In step S1604, when the amplitude of the first noise equality component signal is equal to the amplitude of the noise component signal N1 (YES in step S1604), the noise reduction control unit 610 sets the resistance value at that time in the attenuator circuit 522 as a resistance value for removing noise (step S1606).

Subsequently, the noise reduction control unit 610 detects the phase of the output of the piezo-electric sensor 191 (step S1607). Subsequently, the noise reduction control unit 610 detects the phase of the first noise equality component signal (step S1608).

Subsequently, the noise reduction control unit 610 determines whether the phase of the first noise equality component signal is equal to the phase of the noise component signal N1, which is the target value (step S1609). The phase of the noise component signal N1 is previously stored in the storing unit or the like of the noise reduction control unit 610.

In step S1609, when the phase of the first noise equality component signal is not equal to the phase of the noise component signal N1 (NO in step S1609), the noise reduction control unit 610 adjusts the phase of the first noise equality component signal by the phase correction circuit 523 (step S1610). Specifically, the noise reduction control unit 610 adjusts the resistance value of the variable resistor R13 of the phase correction circuit 523.

The noise reduction control unit 610 of the embodiment repeats the processes of step S1608 to step S1610 until the phase of the first noise equality component signal becomes equal to the phase of the noise component signal N1. In step S1609, when the phase of the first noise equality component signal is equal to the phase of the noise component signal N1 (YES in step S1609), the noise reduction control unit 610 sets the resistance value at that time in the phase correction circuit 523 as a resistance value for removing noise (step S1611).

Subsequently, the noise reduction control unit 610 stops providing the first driving signal and starts applying only the second driving signal to the second horizontal driving source 151B (step S1612).

The processes of step S1613 to step S1622 are the same as the processes of step S1602 to step S1611, thus, the explanation is not repeated.

By the processes from step S1602 to step S1622, the resistance value of the variable resistor R12 of the attenuator circuit 532 and the resistance value of the variable resistor R14 of the phase correction circuit 533 are set.

Subsequently, the noise reduction control unit 610 stores the resistance values set in the variable resistors of the attenuator circuits 522 and 532 and the resistance values set in the variable resistors of the phase correction circuits 523 and 533 in the storing unit or the like of the noise reduction control unit 610 (step S1623).

As described above, in this embodiment, the process of performing the adjustment for removing the noise component is automatically performed.

Sixth Embodiment

The sixth embodiment is explained with reference to drawings. This embodiment is different from the first embodiment that two piezo-electric sensors for detecting the inclination of the mirror 110 in the horizontal direction are provided. In the following explanation, the same components are given the same reference numerals, and explanations are not repeated.

Figure 20:
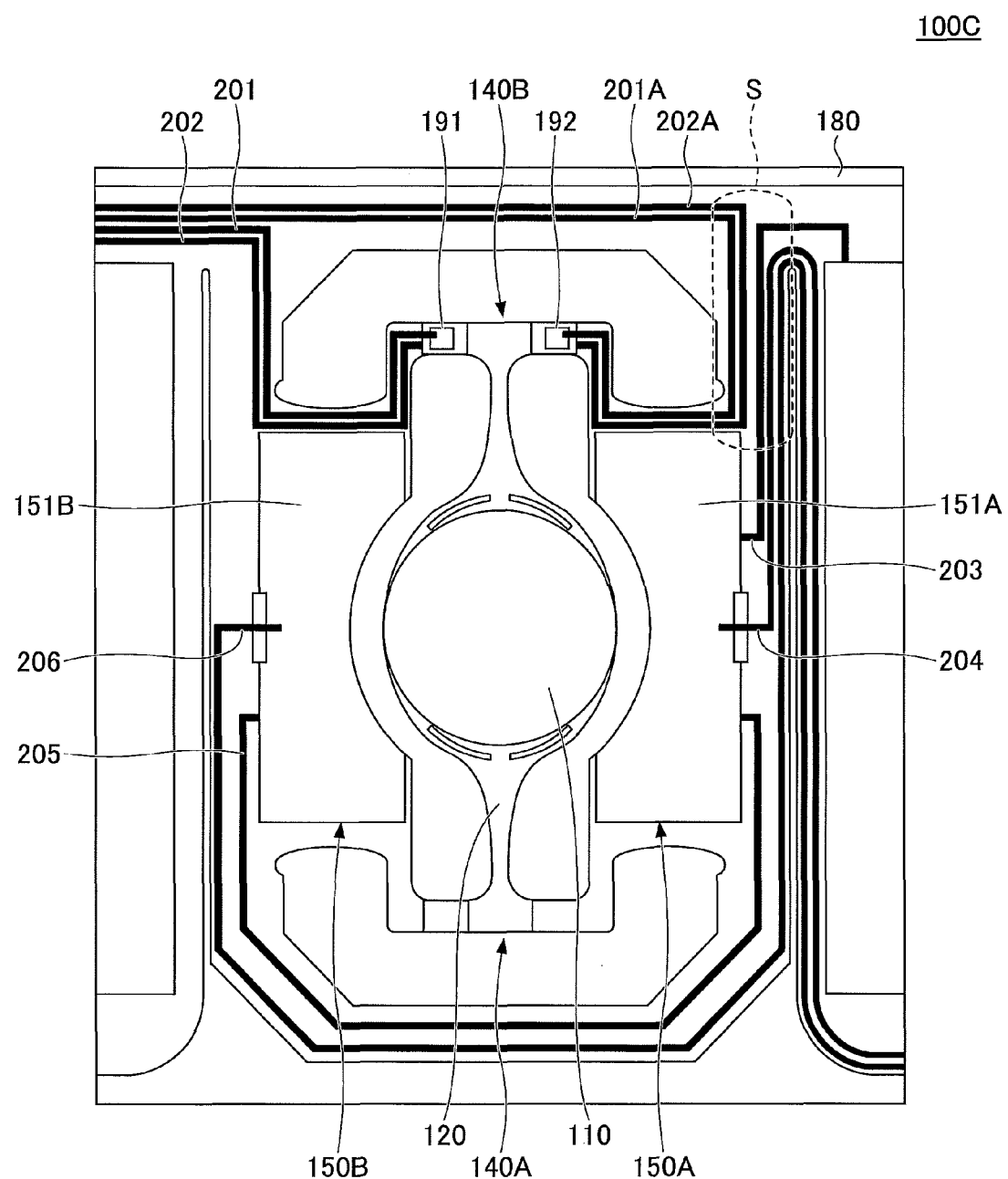
FIG. 20 is a view showing an example of an optical scanner apparatus of an embodiment where a mirror portion is enlarged.

FIG. 20 is a view showing an example of an optical scanner apparatus 100C of the fifth embodiment where a mirror portion is enlarged.

The optical scanner apparatus 1000 of the embodiment includes two piezo-electric sensors 191 and 192. In this embodiment, the sensor signals of the piezo-electric sensors 191 and 192 are led to the second horizontal driving source 151B side, and the drive interconnects for supplying the driving signals to the first horizontal driving source 151A and the second horizontal driving source 151B are led to the first horizontal driving source 151A side.

Further in this embodiment, the phase of the output of the piezo-electric sensor 191 and the phase of the output of the piezo-electric sensor 192 (an example of a fourth piezo-electric sensor) are controlled to be opposite from each other.

In the optical scanner apparatus 100C of the embodiment, the second drive interconnect for lower 205 for applying the driving voltage to the lower electrode of the second horizontal driving source 151B and the second drive interconnect for upper 206 for applying the driving voltage to the upper electrode of the second horizontal driving source 151B are led to the first horizontal driving source 151A side. Further, the second drive interconnect for lower 205 of the embodiment is connected to the lower electrode of the first horizontal driving source 151A. Thus, the voltage applied from the first drive interconnect for lower 203 is also applied to the lower electrode of the second horizontal driving source 151B via the first horizontal driving source 151A and the second drive interconnect for lower 205. The second drive interconnect for upper 206 is formed to extend along the first drive interconnect for lower 203 and the first drive interconnect for upper 204.

Further, in this embodiment, both the first sensor interconnect 201 and the second sensor interconnect 202 connected to the piezo-electric sensor 191 are formed at the second horizontal driving source 151B side. Further, sensor interconnects 201A and 202A (an example of a seventh sensor interconnect and an eighth sensor interconnect) connected to the upper electrode and the lower electrode of the piezo-electric sensor 192, respectively, are also led to the second horizontal driving source 151B side. Then, the sensor interconnects 201A and 202A are formed to extend along the first sensor interconnect 201 and the second sensor interconnect 202.

In this embodiment, as shown in FIG. 20, the sensor interconnects 201A and 202A and the first drive interconnect for lower 203 and the first drive interconnect for upper 204 are adjacent from each other only at a portion shown by dotted line "S". It means that the length where the sensor interconnects are close to the drive interconnects can be shortened to reduce the crosstalk by the driving signals.

Further, in this embodiment, the sensor interconnects 201A and 202A and the first sensor interconnect 201 and the second sensor interconnect 202 are formed to extend along with each other. Thus, the crosstalk components caused by the drive interconnects can be equalized for all of the sensor interconnects.

Further, the piezo-electric sensor 191 and the piezo-electric sensor 192 of the embodiment are provided close to the beams which are oscillated by opposing phases from each other while having the rotational shaft of the mirror 110 as a center, respectively. Specifically, the piezo-electric sensor 191 is connected to a left end portion of the connecting beam 140B while the piezo-electric sensor 192 is connected to a right end portion of the connecting beam 140B. The left end portion of the connecting beam 140B is oscillated by the driving source 151B while the right end portion of the connecting beam 140B is oscillated by the driving source 151A. Thus, it means that the piezo-electric sensor 191 and the piezo-electric sensor 192 are provided at the beams which are oscillated by the opposing phases from each other while having the rotational shaft as a center.

Figure 21:
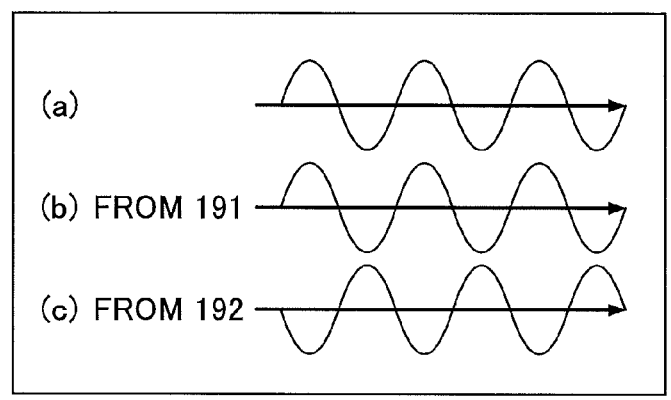
FIG. 21 is a view showing an example of waveforms output from piezo-electric sensors of an embodiment.

FIG. 21 is a view showing an example of waveforms output from the piezo-electric sensors 191 and 192 of the fifth embodiment.

In FIG. 21, an oscillation displacement of the mirror 110 is shown in (a). The waveforms output from the piezo-electric sensors 191 and 192 are shown in (b) and (c), respectively. In this embodiment, the phase of the output of the piezo-electric sensor 191 is the same as that of the oscillation displacement, and the phase of the output of the piezo-electric sensor 192 is opposite from that of the output of the piezo-electric sensor 191.

In this embodiment, by providing the two piezo-electric sensors 191 and 192 as described above, when the difference signal of the outputs of the two piezo-electric sensors 191 and 192 is obtained downstream of the optical scanner apparatus 100C, the level of the output signal can be doubled, for example.

Figure 22:
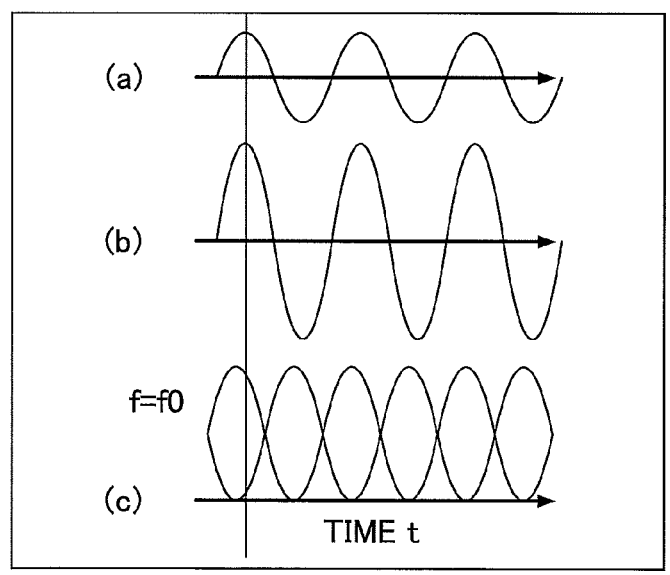
FIG. 22 is a view showing an example of a waveform of a difference signal of outputs of piezo-electric sensors of an embodiment.

FIG. 22 is a view showing an example of a waveform of the difference signal of the outputs of the piezo-electric sensors of the fifth embodiment. In FIG. 22, an oscillation displacement of the mirror 110 is shown in (a). The waveforms of the first driving signal and the second signal are shown in (c). The difference signal obtained by subtracting the output signal of the piezo-electric sensor 192 from the output signal of the piezo-electric sensor 191 is shown in (b). The difference signal shown in (b) of FIG. 22 becomes double the output of each of the piezo-electric sensors 191 and 192. Further, in this embodiment, the output signal of the piezo-electric sensor can be magnified by using the two piezo-electric sensor.

Thus, in this embodiment, even when the crosstalk generated from the drive interconnects is superposed on the output of the piezo-electric sensor, the amplitude of the output of the piezo-electric sensor can be magnified enough to ignore the crosstalk.

Further, the techniques explained in the fourth embodiment and the fifth embodiment may be adapted to the sixth embodiment. For example, in this embodiment, the noise component may be removed from the output of the piezo-electric sensor 191 and the output of the piezo-electric sensor 192.

Seventh Embodiment

The seventh embodiment is explained with reference to drawings. In the seventh embodiment, a photo sensor for detecting the inclination of the mirror is provided below the mirror 110 so that the inclination of the mirror 110 can be precisely detected without an influence of the noise of the sensor interconnects.

Figure 23:
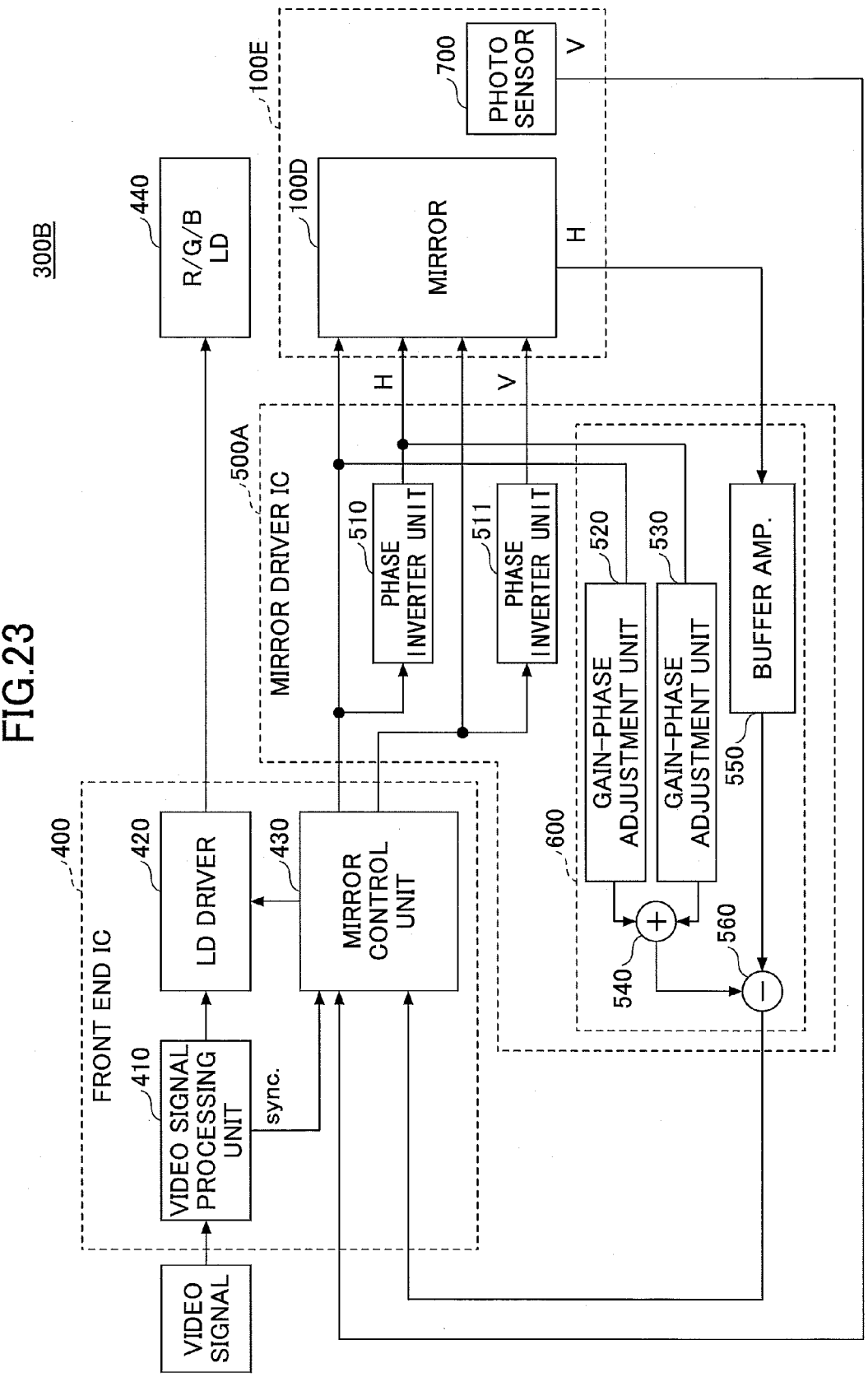
FIG. 23 is a block diagram showing an example of an optical scanner apparatus of an embodiment.

FIG. 23 is a block diagram showing an example of an optical scanner control apparatus 300B of the seventh embodiment. The optical scanner control apparatus 300B of the embodiment includes the front end IC 400, the LD 440, a mirror driver IC 500A, and an optical scanner module 100E.

The mirror driver IC 500A of the embodiment does not include the buffer 570 included in the mirror driver IC 500 shown in FIG. 10 in the fourth embodiment.

The optical scanner module 100E of the embodiment includes an optical scanner apparatus 100D and a photo sensor 700. The optical scanner apparatus 100D does not include the piezo-electric sensors 195 and 196 which detect the inclination of the mirror 110 in the vertical direction, the third sensor interconnect 207A and the fourth sensor interconnect 208A included in the optical scanner apparatus 100 shown in FIG. 1 to FIG. 3 in the first embodiment. The photo sensor 700 detects the inclination of the mirror 110 in the vertical direction. The output of the photo sensor 700 of the embodiment is directly provided to the front end IC 400.

Figure 24:
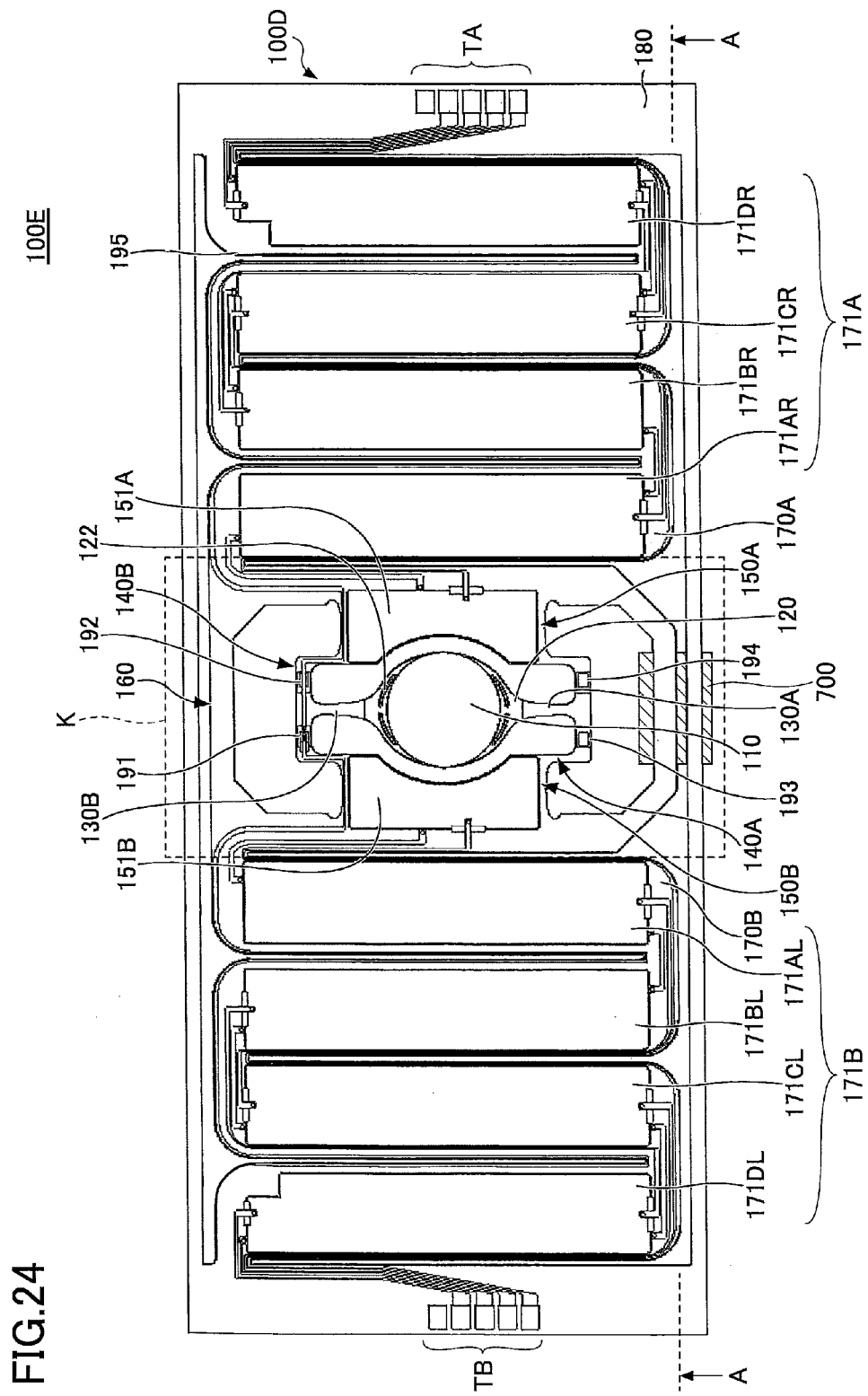
FIG. 24 is a view showing an example of an optical scanner module of an embodiment.

The optical scanner module 100E of the embodiment is explained. FIG. 24 is a view showing an example of the optical scanner module 100E of the seventh embodiment.

In the optical scanner module 100E of the embodiment, the photo sensor 700 is provided below the optical scanner apparatus 100D. In this embodiment, a region including the mirror 110, the mirror support portion 120, the first torsion beam 130A, the second torsion beam 130B, the first connecting beam 140A, the second connecting beam 140B, the first horizontal driving beam 150A, the second horizontal driving beam 150B, and the movable frame 160 are assumed as a movable unit K of the optical scanner apparatus 100D. The photo sensor 700 is positioned below the optical scanner apparatus 100D such that a part of the photo sensor 700 is overlapped with a part of the movable unit K.

Figure 25:
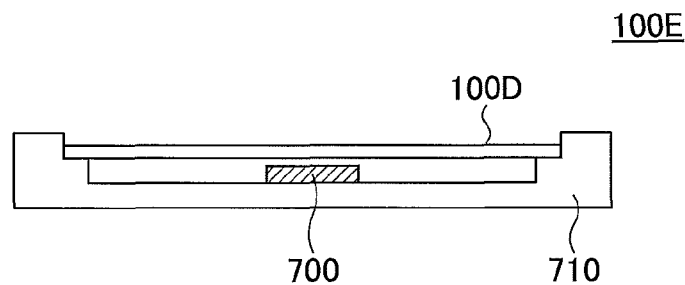
FIG. 25 is a side view of an optical scanner module of an embodiment.

FIG. 25 is a side view of the optical scanner module 100E of the seventh embodiment. FIG. 25 is a cross-sectional view of the optical scanner module 100E taken along an A-A line in FIG. 24. In the optical scanner module 100E, the optical scanner apparatus 100D is fixed to a ceramics package 710 and the photo sensor 700 is positioned between the ceramics package 710 and the optical scanner apparatus 100D. Under this condition, as shown in FIG. 24, the photo sensor 700 is positioned such that a part of the photo sensor 700 is overlapped with a part of the movable unit K of the optical scanner apparatus 100D.

The photo sensor 700 of the embodiment includes a light emitting element and a light receiving element. A part of the light emitted from the light emitting element is reflected by the movable unit K, for example. The movable unit K is oscillated in accordance with the inclination of the mirror 110 which is oscillated by the four driving sources, the first horizontal driving source 151A, the second horizontal driving source 151B, the first vertical driving source 171A and the second vertical driving source 171B. Thus, a position to which the light emitted from the light emitting element is irradiated in the movable unit K is oscillated in accordance with the inclination of the mirror 110. Therefore, the amount of the light returned to the light receiving element from the light emitting element varies in accordance with the inclination of the movable unit K. The photo sensor 700 of the embodiment detects the inclination of the mirror 110 in the vertical direction based on the amount of the light returned to the light receiving element.

Figure 26:
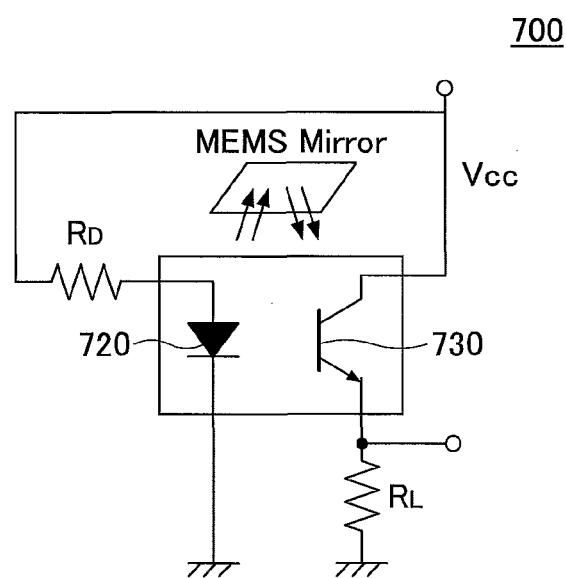
FIG. 26 is a view for explaining an example of a photo sensor.

FIG. 26 is a view for explaining an example of the photo sensor 700. The photo sensor 700 of the embodiment includes a photodiode 720 which is the light emitting element and a phototransistor 730 which is the light receiving element. The photo sensor 700 of the embodiment may be packaged, for example.

Figure 27:
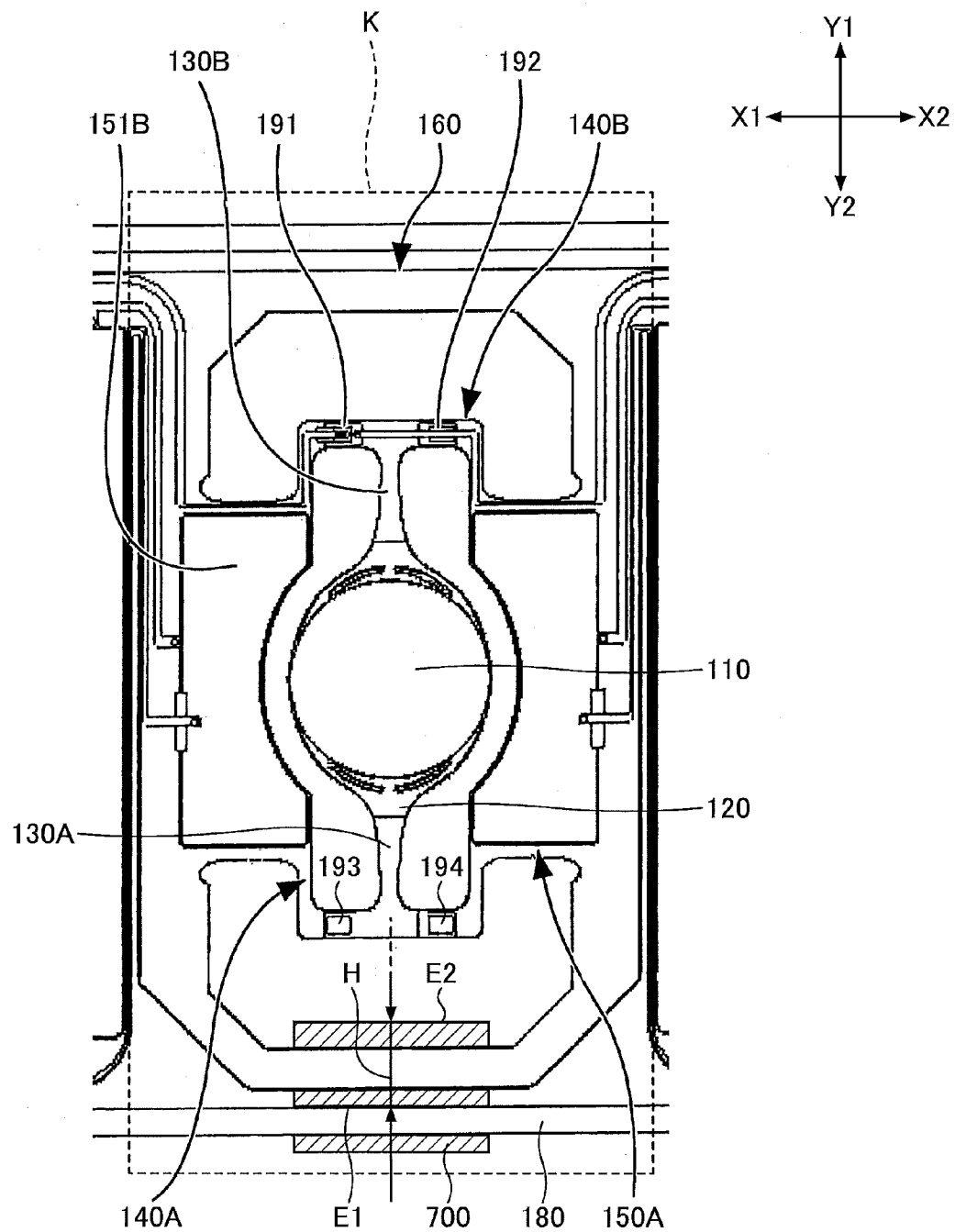
FIG. 27 is a view showing a position of a photo sensor.

The position of the photo sensor 700 of the embodiment is explained. FIG. 27 is a view showing a position of the photo sensor 700.

The photo sensor 700 of the embodiment includes the light emitting element and the light receiving element and positioned below the optical scanner apparatus 100D, as explained above.

The photo sensor 700 of the embodiment is positioned such that a part of the photo sensor 700 is overlapped with a part of the movable unit K. A part of the light emitted from the light emitting element 720 of the photo sensor 700 is shut by the movable unit K when the mirror 110 is not inclined in the vertical direction. Then, when the mirror 110 is inclined in the vertical direction, the amount of the light emitted from the light emitting element 720 and shut (reflected) by the movable unit K decreases so that the amount of the light returned to the light receiving element 730 decreases. In this embodiment, the photo sensor 700 may be positioned at a position where the light emitted from the light emitting element 720 is not shut by the movable unit K at all when the inclination of the mirror 110 in the vertical direction becomes the maximum.

Further in this embodiment, the photo sensor 700 may be positioned such that the light emitting element 720 and the light receiving element 730 are aligned in an X1-X2 direction shown in FIG. 27 in the photo sensor 700. Further, at this time, the center of an external diameter of the photo sensor 700 and a center axis of the mirror 110 may match with each other. Further, the photo sensor 700 of the embodiment may be positioned to be overlapped at portions with the fixed frame 180.

The photo sensor 700 of the embodiment is positioned such that the output of the photo sensor 700 becomes the closest to an actual value of the inclination of the mirror 110.

A method of determining the position of the photo sensor 700 is explained. In this embodiment, the position of the photo sensor 700 is moved in a Y2-Y1 direction while assuming a position at which a distance between an end surface E1 of the inside of the fixed frame 180 to an end surface E2 of the photo sensor 700 facing the mirror 110 is 600 μm as a initial position under a condition that the external diameter of the photo sensor 700 and the center axis of the mirror 110 match with each other. Then, the output of the photo sensor 700 and the actual value are compared for each of the positions to find a position where the output of the photo sensor 700 becomes the closest or substantially equal to the actual value as the position of the photo sensor 700.

Figure 28:
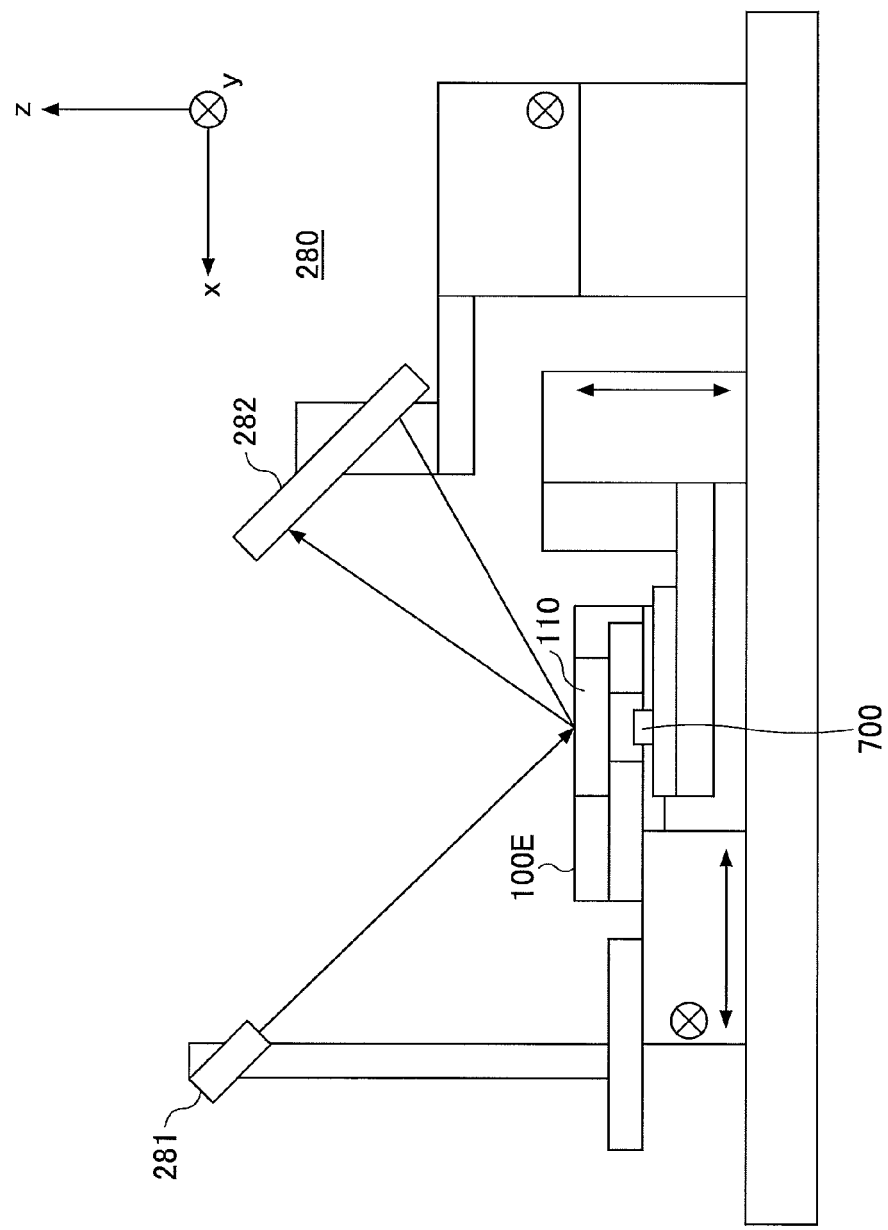
FIG. 28 is a view for explaining measuring the inclination of a mirror in the vertical direction.

A measurement of the actual value of the inclination of the mirror 110 in the vertical direction is explained. FIG. 28 is a view for explaining measuring the inclination of the mirror in the vertical direction.

In this embodiment, the optical scanner module 100E is provided in a measurement apparatus 280. Then, the light emitted from the LD (Laser Diode) 281 is irradiated on the oscillated mirror 110 to have a Position Sensitive Detector (PSD) 282 receive the reflected light from the LD 281. The voltage in accordance with the amount of lights output from the PSD 282 is the actual value indicating the inclination of the mirror 110 in the vertical direction (displacement).

Figure 29:
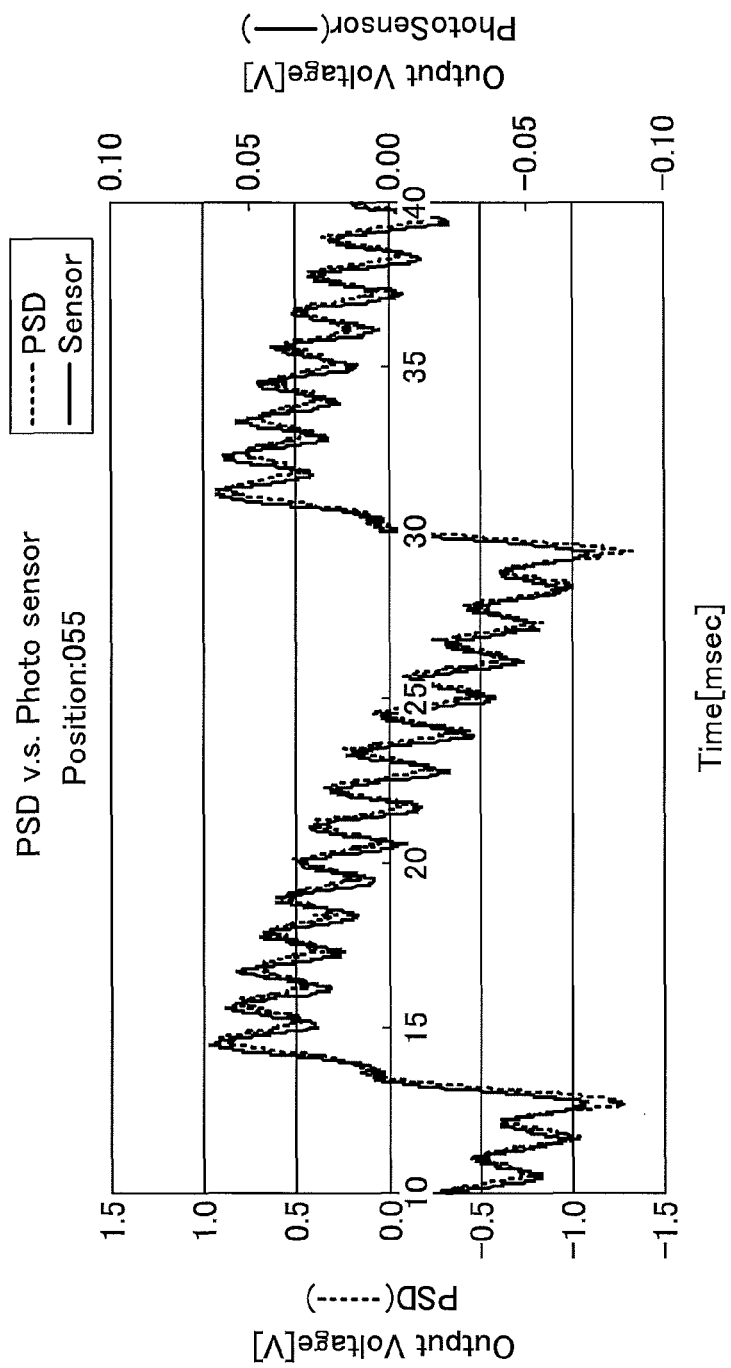
FIG. 29 is a view showing an example of a comparison result between an actual value and an output of a photo sensor.

A comparison result between the actual value and the output of the photo sensor 700 is explained. FIG. 29 is a view showing an example of a comparison result between the actual value and the output of the photo sensor 700.

FIG. 29 shows a case in which the photo sensor 700 is positioned 550 µm away from the initial position in the Y1 direction (see FIG. 27). In FIG. 29, the distance H between the end surface E1 of the fixed frame 180 and the end surface E2 of the photo sensor 700 becomes 600 µm+550 µm. At this time, the photo sensor 700 is positioned such that a part of the photo sensor 700 overlaps a part of the movable frame 160 in the Y2 direction side. In FIG. 29, although there is a slight difference between peaks of the output of the PSD 282 (actual value) shown by the dotted line and peaks of the output of the photo sensor 700 shown by the solid line, it can be understood that the output of the photo sensor 700 has substantially the same shape as that of the actual value. Thus, in this embodiment, the photo sensor 700 may be positioned such that the distance H=600 µm+550 µm, in other words, a position where a part of the photo sensor 700 overlaps a part of the movable frame 160 in the Y2 direction side.

Figure 30:
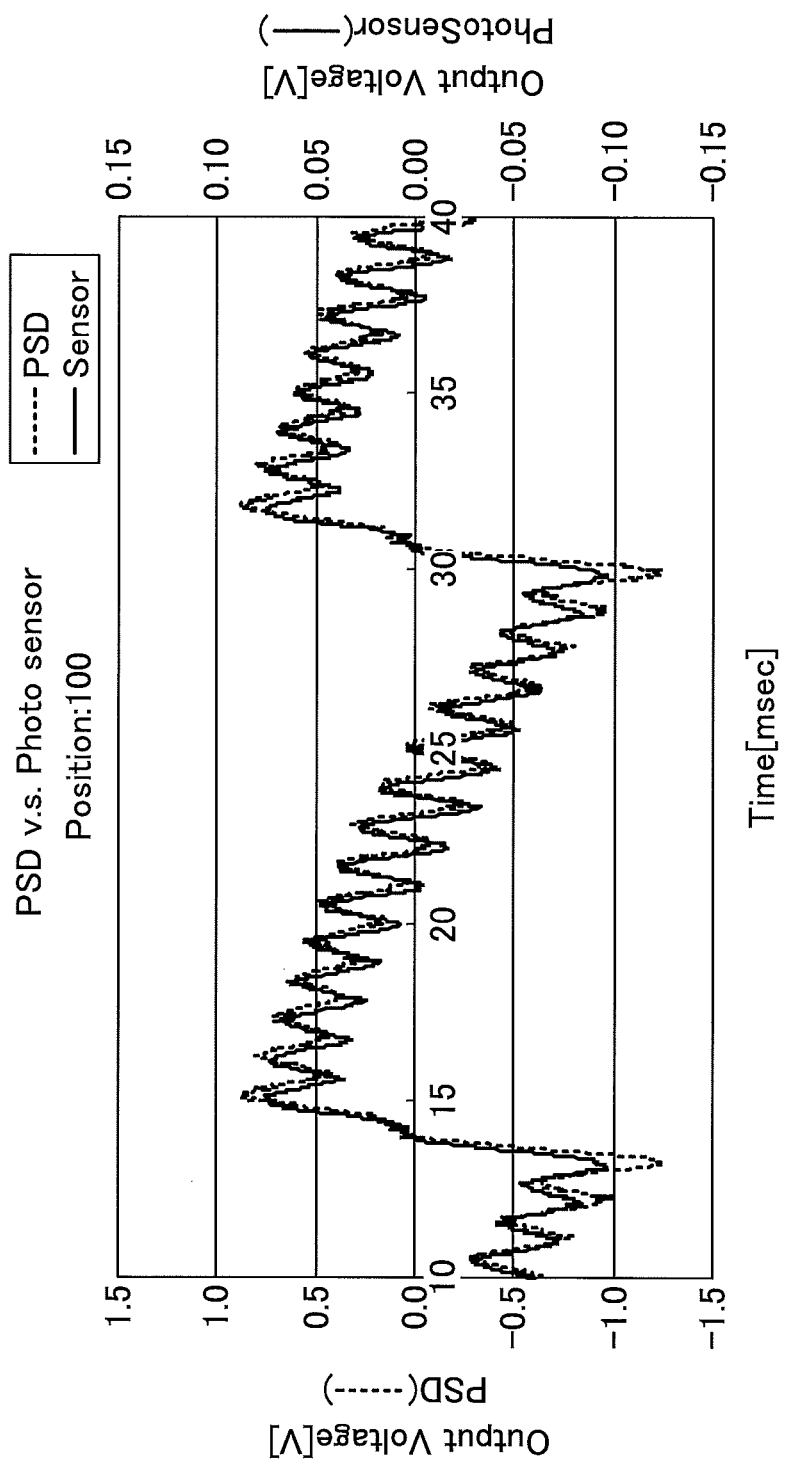
FIG. 30 is a view showing an example of a comparison result between an actual value and an output of a photo sensor.

FIG. 30 is a view showing another example of a comparison result between the actual value and the output of the photo sensor 700. FIG. 30 shows a case in which the photo sensor 700 is positioned 1000 µm away from the initial position in the Y1 direction (see FIG. 27). In FIG. 30, the distance H between the end surface E1 of the fixed frame 180 and the end surface E2 of the photo sensor 700 becomes 600 µm+1000 µm. At this time, the photo sensor 700 is positioned such that a part of the photo sensor 700 overlaps a part of the mirror 110. In FIG. 30, although there is a slight difference between peaks of the output of the PSD 282 (actual value) shown by the dotted line and peaks of the output of the photo sensor 700 shown by the solid line, it can be understood that the output of the photo sensor 700 has substantially the same shape as that of the actual value. Thus, in this embodiment, the photo sensor 700 may be positioned such that the distance H=600 µm+1000 µm, in other words, a position where a part of the photo sensor 700 overlaps a part of the mirror 110.

Figure 31:
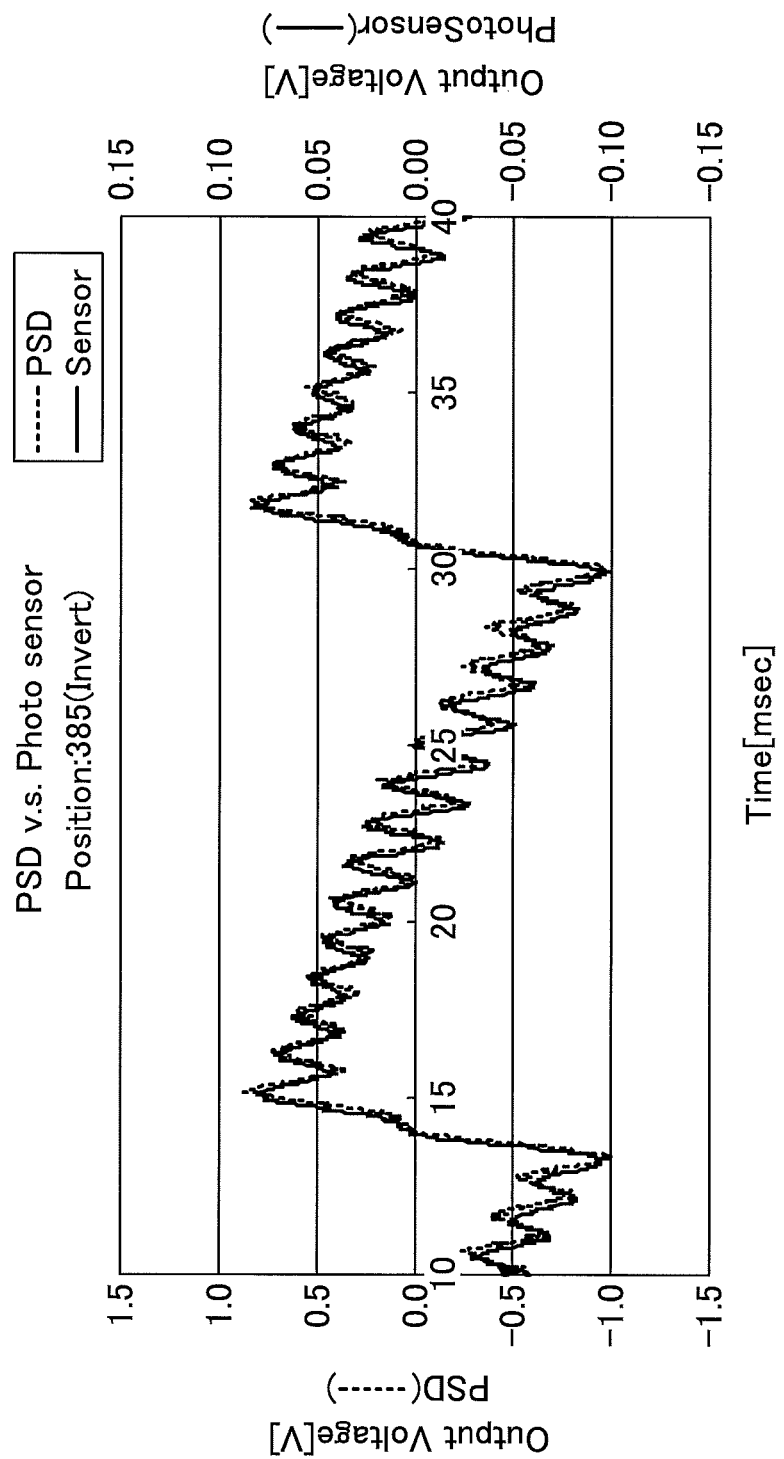
FIG. 31 is a view showing an example of a comparison result between an actual value and an output of a photo sensor.

FIG. 31 is a view showing another example of a comparison result between the actual value and the output of the photo sensor 700. FIG. 31 shows a case in which the photo sensor 700 is positioned 3850 µm away from the initial position in the Y1 direction (see FIG. 27). In FIG. 31, the distance H between the end surface E1 of the fixed frame 180 and the end surface E2 of the photo sensor 700 becomes 600 µm+3850 µm. At this time, the photo sensor 700 is positioned such that a part of the photo sensor 700 overlaps a part of the movable frame 160 in the Y1 direction side.

At this time, the output of the photo sensor 700 becomes a signal having an opposite phase as that of the output of the photo sensor 700 when the photo sensor 700 is positioned to overlap a part of the movable frame 160 in the Y2 direction side. Thus, for the case shown in FIG. 31, a signal obtained by reversing the phase of the output of the photo sensor 700 is used as the output of the photo sensor 700 to be compared with the actual value.

In FIG. 31, the output of the PSD 282 (actual value) shown by a dotted line, and the output of the photo sensor 700 shown by a solid line substantially match with each other. Further, for the case shown in FIG. 31, it can be understood that the output of the photo sensor 700 is closer to the actual value compared with the cases shown in FIG. 29 and FIG. 30 when comparing the overlaps of the outputs of the photo sensor 700 and the actual values, respectively.

In the optical scanner module 100D of the embodiment, the movable frame 160 in the Y1 direction side functions as an axial shaft when the mirror 110 is oscillated in the vertical direction. In this embodiment, it can be understood from the results shown in FIG. 29 to FIG. 31 that the inclination of the mirror 110 can be more precisely detected when the photo sensor 700 is positioned closer to the movable frame 160 which functions as the axial shaft for oscillation in the vertical direction.

Thus, in this embodiment, the photo sensor 700 may be positioned such that the distance H=600 µm+3850 µm, in other words, at a position where a part of the photo sensor 700 overlaps a part of the movable frame 160 in the Y1 direction side.

Further, although this embodiment is assumed that the photo sensor 700 is positioned on a center axis of the mirror 110, this embodiment is not so limited. For example, the photo sensor 700 may be positioned such that a part of the photo sensor 700 overlaps parts of the mirror 110 and the first horizontal driving beam 150A or such that a part of the photo sensor 700 overlaps parts of the mirror 110 and the second horizontal driving beam 150B. The photo sensor 700 may be positioned such that a part of the photo sensor 700 overlaps a part of the mirror 110.

The photo sensor 700 of the embodiment may be positioned at any place in the movable unit K provided that it can be determined that the inclination of the mirror 110 can be sufficiently precisely detected when compared with the actual value.

As described above, in this embodiment, by using the photo sensor 700 instead of the piezo-electric sensor when detecting the inclination of the vertical direction of the mirror 110, it is not necessary to care for the noise of the sensor interconnects and the inclination of the mirror can be precisely detected.

According to the embodiments, the inclination of the mirror can be precisely detected by reducing the noise of the sensor interconnects.

Although a preferred embodiment of the optical scanner apparatus or the optical scanner control apparatus has been specifically illustrated and described, it is to be understood that minor modifications may be made therein without departing from the sprit and scope of the invention as defined by the claims.

The present invention is not limited to the specifically disclosed embodiments, and variations and modifications may be made without departing from the scope of the present invention.

Various aspects of the subject-matter described herein are set out non-exhaustively in the following numbered clauses:

1. An optical scanner apparatus comprising:
a mirror;
a mirror support portion which supports the mirror;
a first torsion beam and a second torsion beam which support the mirror support portion from both sides in an axial direction around which the mirror support portion is oscillated by torsions of the first torsion beam and the second torsion beam;
a first horizontal driving beam and a second horizontal driving beam provided to interpose the mirror and the mirror support portion therebetween and configured to include a first horizontal driving source and a second horizontal driving source, respectively, for oscillating the mirror and the mirror support portion around the axial direction;
a connecting beam that connects one side of the first horizontal driving beam and the second horizontal driving beam to the first torsion beam;
a first piezo-electric sensor including a lower electrode, a piezo-electric element and an upper electrode formed in this order on the connecting beam and configured to detect a displacement of the connecting beam by an oscillation of the first torsion beam and the second torsion beam around the axial direction when the mirror is being oscillated by driving voltages applied to the first horizontal driving source and the second horizontal driving source of the first horizontal driving beam and the second horizontal driving beam, respectively;

a first sensor interconnect and a second sensor interconnect connected to one of the upper electrode and the lower electrode of the first piezo-electric sensor and the other of the upper electrode and the lower electrode of the first piezo-electric sensor, respectively, the first sensor interconnect and the second sensor interconnect being formed to extend toward the first horizontal driving beam and the second horizontal driving beam, respectively.

2. The optical scanner apparatus according to clause 1, further comprising:

a first drive interconnect for providing the driving voltage to the first horizontal driving source formed to extend along the first sensor interconnect; and a second drive interconnect for providing the driving voltage to the second horizontal driving source to extend along the second sensor interconnect, and wherein a distance at which the first drive interconnect and the first sensor interconnect extend along with each other and a distance at which the second drive interconnect and the second sensor interconnect extend along with each other are substantially the same.

3. The optical scanner apparatus according to clause 1, further comprising:

a first drive interconnect for providing the driving voltage to the first horizontal driving source formed to extend along the first sensor interconnect;

a second drive interconnect for providing the driving voltage to the second horizontal driving source to extend along the second sensor interconnect;

a first guard pattern connected to a ground terminal and provided between the first drive interconnect and the first sensor interconnect; and a second guard pattern connected to a ground terminal and provided between the second drive interconnect and the second sensor interconnect.

4. The optical scanner apparatus according to clause 3, wherein the first guard pattern is formed at an entire portion between the first drive interconnect and the first sensor interconnect, and the second guard pattern is formed at an entire portion between the second drive interconnect and the second sensor interconnect.

5. The optical scanner apparatus according to clause 1, further comprising:

a movable frame which surrounds the mirror, the mirror support portion, the first torsion beam, the second torsion beam, the first horizontal driving beam, the second horizontal driving beam, and the connecting beam, a first vertical driving beam and a second vertical driving beam provided to interpose the movable frame therebetween, respectively connected to the movable frame and configured to include a first vertical driving source and a second vertical driving source, respectively, for oscillating the mirror and the mirror support portion in a direction perpendicular to the axial direction; and a second piezo-electric sensor including a lower electrode, a piezo-electric element and an upper electrode formed in this order on the first vertical driving beam, and configured to detect a displacement of the first vertical driving beam when the mirror is being oscillated by a driving voltage applied to the first vertical driving source of the first vertical driving beam.

6. The optical scanner apparatus according to clause 5, further comprising:

a third sensor interconnect and a fourth sensor interconnect connected to one of the upper electrode and the lower electrode of the second piezo-electric sensor and the other of the upper electrode and the lower electrode of the second piezo-electric sensor, respectively such that the third sensor interconnect and the fourth sensor interconnect are formed to extend along the first sensor interconnect, a first drive interconnect for providing the driving voltage to the first horizontal driving source formed to extend along the first sensor interconnect;

a second drive interconnect for providing the driving voltage to the second horizontal driving source to extend along the second sensor interconnect;

a third drive interconnect or 210B (203) for providing the driving voltage to the first vertical driving source formed to extend along the first sensor interconnect;

a first guard pattern connected to a ground terminal and provided to separate the first sensor interconnect, the third sensor interconnect and the fourth sensor interconnect from the first drive interconnect and the third drive interconnect; and a second guard pattern connected to a ground terminal and provided between the second drive interconnect and the second sensor interconnect.

7. The optical scanner apparatus according to clause 6, further comprising:

a third piezo-electric sensor including a lower electrode, a piezo-electric element and an upper electrode formed in this order on the second vertical driving beam, and configured to detect a displacement of the second vertical driving beam when the mirror is being oscillated by a driving voltage applied to the second vertical driving source of the second vertical driving beam;

a fifth sensor interconnect and a sixth sensor interconnect connected to one of the upper electrode and the lower electrode of the third piezo-electric sensor and the other of the upper electrode and the lower electrode of the third piezo-electric sensor, respectively such that the fifth sensor interconnect and the sixth sensor interconnect are formed to extend along the second sensor interconnect; and a fourth drive interconnect for providing the driving voltage to the second vertical driving source formed to extend along the second sensor interconnect, wherein the first guard pattern and the second guard pattern are formed to extend from points where the first sensor interconnect and the third sensor interconnect and the fourth sensor interconnect start to extend along with each other, and where the second sensor interconnect and the fifth sensor interconnect and the sixth sensor interconnect start to extend along with each other, respectively.

8. The optical scanner apparatus according to clause 1, wherein the first horizontal driving source and the second horizontal driving source are driven by driving voltages whose phases are opposite from each other.

9. An optical scanner control apparatus comprising:

the optical scanner apparatus according to clause 1; and a noise reduction unit that generates a first noise equality component signal and a second noise equality component signal from a first driving voltage applied to the first horizontal driving source and a second driving voltage applied to the second horizontal driving source, respectively, and removes a noise component from an output of the piezo-electric sensor based on the first noise equality component signal and the second noise equality component signal.

10. The optical scanner control apparatus according to clause 9,
wherein the noise reduction unit includes a first gain-phase adjustment unit and a second gain-phase adjustment unit corresponding to the first driving voltage and the second driving voltage, respectively, and
the first noise equality component signal is generated by adjusting the amplitude and the phase of the first driving voltage by the first gain-phase adjustment unit, and
the second noise equality component signal is generated by adjusting the amplitude and the phase of the second driving voltage by the second gain-phase adjustment unit.

11. The optical scanner control apparatus according to clause 10,
wherein the amplitude and the phase of the first noise equality component signal is adjusted to be equal to the amplitude and the phase of a signal output from the first piezo-electric sensor when the first driving voltage is applied to the first horizontal driving source, the second driving voltage having a frequency by which the mirror is not oscillated when the second driving voltage is applied to the first horizontal driving source, and
the amplitude and the phase of the second noise equality component signal is adjusted to be equal to the amplitude and the phase of a signal output from the first piezo-electric sensor when the second driving voltage is applied to the first horizontal driving source, the second driving voltage having a frequency by which the mirror is not oscillated when the second driving voltage is applied to the first horizontal driving source.

12. The optical scanner control apparatus according to clause 9,
wherein the noise reduction unit includes
an adding circuit that adds the first noise equality component signal and the second noise equality component signal, and
a subtracting circuit that subtracts an adding result of the first noise equality component signal and the second noise equality component signal from the output of the piezo-electric sensor.

13. The optical scanner control apparatus according to clause 10,
wherein the noise reduction unit includes
a control unit that generates the first noise equality component signal and the second noise equality component signal by controlling the first gain-phase adjustment unit and the second gain-phase adjustment unit from the first driving voltage and the second driving voltage, respectively.

14. An optical scanner apparatus comprising:
a mirror;
a mirror support portion which supports the mirror;
a first torsion beam and a second torsion beam which support the mirror support portion from both sides in an axial direction around which the mirror support portion is oscillated by torsions of the first torsion beam and the second torsion beam;
a first horizontal driving beam and a second horizontal driving beam provided to interpose the mirror and the mirror support portion therebetween and configured to include a first horizontal driving source and a second horizontal driving source, respectively, for oscillating the mirror and the mirror support portion around the axial direction;
a connecting beam that connects one side of the first horizontal driving beam and the second horizontal driving beam to the first torsion beam;

a first piezo-electric sensor and a fourth piezo-electric sensor each including a lower electrode, a piezo-electric element and an upper electrode formed in this order on the connecting beam and configured to detect a displacement of the connecting beam by an oscillation of the first torsion beam and the second torsion beam around the axial direction when the mirror is being oscillated by driving voltages applied to the first horizontal driving source and the second horizontal driving source of the first horizontal driving beam and the second horizontal driving beam, respectively;
a first sensor interconnect and a second sensor interconnect connected to one of the upper electrode and the lower electrode of the first piezo-electric sensor and the other of the upper electrode and the lower electrode of the first piezo-electric sensor, respectively;
a seventh sensor interconnect and an eighth sensor interconnect connected to one of the upper electrode and the lower electrode of the fourth piezo-electric sensor and the other of the upper electrode and the lower electrode of the fourth piezo-electric sensor, respectively;
a first drive interconnect for providing the driving voltage to the first horizontal driving source; and
a second drive interconnect for providing the driving voltage to the second horizontal driving source,
the first sensor interconnect, the second sensor interconnect, the seventh sensor interconnect and the eight sensor interconnect being formed to extend toward one of the first horizontal driving beam and the second sensor interconnect and the first drive interconnect and the second drive interconnect being formed to extend toward the other of the first horizontal driving beam and the second sensor interconnect.

What is claimed is:
1. An optical scanner apparatus comprising:
a mirror;
a mirror support portion which supports the mirror;
a torsion beam which supports the mirror support portion in an axial direction around which the mirror support portion is oscillated by torsion of the torsion beam;
a driving source;
a driving beam that is oscillated by a driving voltage applied to the driving source for oscillating the mirror and the mirror support portion;
a piezo-electric sensor configured to detect a displacement of the mirror when the mirror is being oscillated by the driving voltage applied to the driving source;
a sensor interconnect connected to the piezo-electric sensor; and
a guard pattern connected to a ground terminal to be grounded and formed between the driving source and the sensor interconnect to divide a space between the driving source and the sensor interconnect, so as to suppress influences from the driving source on the sensor interconnect.

2. The optical scanner apparatus according to claim 1,
wherein the driving source is a horizontal driving source and the driving beam is a horizontal driving beam for oscillating the mirror and the mirror support portion around the axial direction, and
wherein the piezo-electric sensor is configured to detect a displacement by an oscillation of the torsion beam around the axial direction when the mirror is being oscillated by the driving voltage applied to the horizontal driving source.

3. The optical scanner apparatus according to claim 2, further comprising:
a vertical driving source;
a vertical driving beam that is oscillated by a driving voltage applied to the vertical driving source for oscillating the mirror and the mirror support portion in a direction perpendicular to the axial direction,
wherein the guard pattern is provided to extend between the vertical driving source and the sensor interconnect.

4. The optical scanner apparatus according to claim 1, wherein the driving source is a vertical driving source and the driving beam is a vertical driving beam for oscillating the mirror and the mirror support portion in a direction perpendicular to the axial direction, and
wherein the piezo-electric sensor is configured to detect a displacement when the mirror is being oscillated by a driving voltage applied to the vertical driving source.

5. The optical scanner apparatus according to claim 4, further comprising:
a horizontal driving source;
a horizontal driving beam that is oscillated by a driving voltage applied to the horizontal driving source for oscillating the mirror and the mirror support portion around the axial direction, and
wherein the guard pattern is provided to extend between the horizontal driving source and the sensor interconnect.

6. The optical scanner apparatus according to claim 1,
wherein the guard pattern is physically provided between the driving source and the sensor interconnect.

7. The optical scanner apparatus according to claim 1,
wherein the sensor interconnect transmits a current value output from the piezo-electric sensor corresponding to the displacement of the torsion beam.

8. The optical scanner apparatus according to claim 1, further comprising a drive interconnect that provides the driving voltage to the driving source,
wherein the sensor interconnect extends along the drive interconnect, and the guard pattern is formed between the sensor interconnect and the drive interconnect.

* * * * *